US012753883B2

(12) United States Patent
Stuart et al.

(10) Patent No.: US 12,753,883 B2
(45) Date of Patent: Oct. 6, 2026

(54) OFFLOAD SYSTEM

(71) Applicant: Echeneidae Inc., Wixom, MI (US)

(72) Inventors: Julia Stuart, Ann Arbor, MI (US); Eric Harding, Detroit, MI (US)

(73) Assignee: ECHENEIDAE INC., Wixom, MI (US)

( * ) Notice: Subject to any disclaimer, the term of this patent is extended or adjusted under 35 U.S.C. 154(b) by 0 days.

(21) Appl. No.: 18/920,577

(22) Filed: Oct. 18, 2024

(65) Prior Publication Data

US 2025/0129890 A1 Apr. 24, 2025

Related U.S. Application Data

(60) Provisional application No. 63/592,102, filed on Oct. 20, 2023.

(51) Int. Cl.
*F17C 7/00* (2006.01)

(52) U.S. Cl.
CPC ........ *F17C 7/00* (2013.01); *F17C 2205/0323* (2013.01); *F17C 2205/037* (2013.01); *F17C 2221/013* (2013.01); *F17C 2250/0443* (2013.01); *F17C 2265/06* (2013.01); *F17C 2270/0173* (2013.01)

(58) Field of Classification Search
CPC .............. B01D 2257/504; B01D 53/62; B01D 2259/4566; F17C 2205/037; F16L 55/1007; F01N 3/00
See application file for complete search history.

(56) References Cited

U.S. PATENT DOCUMENTS

| | | | |
|---|---|---|---|
| 2,029,707 | A | 2/1936 | Dodelin |
| 2,431,698 | A | 12/1947 | Lombard |
| 2,537,085 | A | 1/1951 | Phelps |
| 2,606,673 | A | 8/1952 | Young |
| 2,862,625 | A | 12/1958 | Norris |

(Continued)

FOREIGN PATENT DOCUMENTS

| | | | |
|---|---|---|---|
| CA | 2630297 | A1 | 10/2009 |
| CN | 104591107 | A | 5/2015 |

(Continued)

OTHER PUBLICATIONS

Sharma, Shivom , et al., "Carbon Dioxide Capture From Internal Combustion Engine Exhaust Using Temperature Swing Adsorption", Frontiers in Energy Research, Dec. 2019, vol. 7, Article 143.

(Continued)

*Primary Examiner* — Timothy P. Kelly
(74) *Attorney, Agent, or Firm* — Fredrikson & Byron, P.A.

(57) ABSTRACT

An offload system is provided. The offload system is configured to offload a target species stored in an onboard volume positioned onboard a vehicle to an offboard volume. In one aspect, the offload system includes an onboard system positioned onboard the vehicle and an offboard system positioned offboard the vehicle. The onboard system selectively allows the target species stored in the onboard volume to flow downstream to the offboard system, which includes the offboard volume. The onboard system, the offboard system, or both, include features that facilitate efficient and safe offloading of the target species from the onboard volume to the offboard volume.

20 Claims, 14 Drawing Sheets

(56) References Cited

U.S. PATENT DOCUMENTS

| | | | |
|---|---|---|---|
| 3,559,890 | A | 2/1971 | Brooks et al. |
| 3,613,256 | A | 10/1971 | Belopolsky et al. |
| 3,667,714 | A | 6/1972 | Theodore, Jr. |
| 4,015,810 | A | 4/1977 | Williams |
| 4,187,950 | A | 2/1980 | Peet |
| 4,294,481 | A | 10/1981 | Pearl |
| 4,899,895 | A | 2/1990 | Espasandin et al. |
| 4,899,968 | A | 2/1990 | Eaglin et al. |
| 5,071,100 | A | 12/1991 | Sweeny |
| 5,100,007 | A | 3/1992 | Espasandin et al. |
| 5,298,226 | A | 3/1994 | Nowobilski |
| 5,298,231 | A | 3/1994 | Rockenfeller |
| 5,362,022 | A | 11/1994 | Mcloughlin et al. |
| 5,913,467 | A | 6/1999 | Berg |
| 6,086,659 | A | 7/2000 | Tentarelli |
| 6,280,508 | B1 | 8/2001 | Garrett et al. |
| 6,387,845 | B1 | 5/2002 | Masahiro et al. |
| 7,621,980 | B2 | 11/2009 | Saito et al. |
| 8,191,848 | B2 | 6/2012 | Mcloughlin et al. |
| 8,591,627 | B2 | 11/2013 | Jain |
| 8,807,256 | B2 | 8/2014 | Gibb et al. |
| 9,499,105 | B1 | 11/2016 | Long |
| 9,605,798 | B2 | 3/2017 | Brown et al. |
| 9,656,759 | B2 | 5/2017 | De La Fuente Carnero et al. |
| 10,279,306 | B2 | 5/2019 | Gebald et al. |
| 10,429,097 | B1 | 10/2019 | Sexton |
| 10,894,230 | B2 | 1/2021 | Sugiyama |
| 11,035,280 | B2 | 6/2021 | Fujihara et al. |
| 11,560,817 | B2 | 1/2023 | Reynolds et al. |
| 11,828,411 | B1 | 11/2023 | Oh |
| 12,275,576 | B2 | 4/2025 | Gourdier, Jr. |
| 2003/0029977 | A1 | 2/2003 | Kim |
| 2003/0190509 | A1 | 10/2003 | Byron, Jr. et al. |
| 2004/0011198 | A1 | 1/2004 | Keefer et al. |
| 2005/0061301 | A1 | 3/2005 | Meiller et al. |
| 2005/0199297 | A1* | 9/2005 | Nimberger .............. F16L 29/04 137/614.05 |
| 2007/0125235 | A1 | 6/2007 | Begley et al. |
| 2008/0202339 | A1 | 8/2008 | Nalette et al. |
| 2009/0056827 | A1 | 3/2009 | Tschantz |
| 2009/0151560 | A1 | 6/2009 | Adams et al. |
| 2009/0211448 | A1 | 8/2009 | Mcclain |
| 2009/0275120 | A1 | 11/2009 | Koch et al. |
| 2010/0196234 | A1 | 8/2010 | Hammer et al. |
| 2010/0251887 | A1 | 10/2010 | Jain |
| 2011/0088549 | A1 | 4/2011 | Sayari et al. |
| 2011/0094602 | A1* | 4/2011 | Brown .................... F16L 37/26 137/614.04 |
| 2011/0167798 | A1 | 7/2011 | Evans-Beauchamp |
| 2011/0206581 | A1 | 8/2011 | Ackley et al. |
| 2013/0205998 | A1 | 8/2013 | Dressler |
| 2013/0298532 | A1 | 11/2013 | Hamad et al. |
| 2013/0334269 | A1 | 12/2013 | Cardonna et al. |
| 2014/0099245 | A1 | 4/2014 | Hamad |
| 2014/0165569 | A1 | 6/2014 | Hsu |
| 2015/0027793 | A1 | 1/2015 | Janzen |
| 2015/0360172 | A1 | 12/2015 | Deptala |
| 2016/0229680 | A1* | 8/2016 | Cornett ............... F16L 55/1015 |
| 2017/0248051 | A1 | 8/2017 | Eddaoudi et al. |
| 2018/0304795 | A1 | 10/2018 | Moore |
| 2019/0209961 | A1 | 7/2019 | Kennedy et al. |
| 2019/0255941 | A1 | 8/2019 | Gibb et al. |
| 2020/0009504 | A1 | 1/2020 | Eisenberger |
| 2020/0032690 | A1 | 1/2020 | Hengst et al. |
| 2020/0346162 | A1 | 11/2020 | Fowler et al. |
| 2021/0016220 | A1 | 1/2021 | Elliott et al. |
| 2021/0253456 | A1 | 8/2021 | Johnson |
| 2022/0010707 | A1 | 1/2022 | Sharma et al. |
| 2022/0298952 | A1* | 9/2022 | Thobe ..................... F01N 13/08 |
| 2023/0015857 | A1 | 1/2023 | Miller et al. |
| 2023/0027070 | A1 | 1/2023 | Malik et al. |
| 2024/0328580 | A1 | 10/2024 | Pemberton et al. |

FOREIGN PATENT DOCUMENTS

| | | | |
|---|---|---|---|
| CN | 207769485 | U | 8/2018 |
| CN | 208512195 | U | 2/2019 |
| GB | 2527608 | A | 12/2015 |
| JP | H06233910 | A | 8/1994 |

OTHER PUBLICATIONS

Reynolds, Christina , "Decarbonizing Freight Transport: Mobile Carbon Capture from Heavy-Duty Vehicles", A dissertation sub•mitted in partial fulfillment of the requirements for the degree of Doctor of Philosophy (Environmental Engineering) in the University of Michigan 2019.

Gross, Paul , "Carbon Capture for Semi Trucks, Launch HN: Remora (YC W21)", Hacker News, Mar. 10, 2021.

* cited by examiner

OFFLOAD SYSTEM

RELATED APPLICATIONS

This application claims the benefit of U.S. Provisional Patent Application No. 63/592,102, filed Oct. 20, 2023, the contents of which are incorporated herein by reference.

TECHNICAL FIELD

The present disclosure relates generally to an offload system that facilitates offloading of a target species stored onboard a vehicle to an offboard volume.

BACKGROUND

In some instances, it may be desirable to offload a target species (e.g., carbon dioxide) stored in an onboard volume to an offboard volume, with the onboard volume being positioned onboard a vehicle and the offboard volume being positioned offboard the vehicle. Offloading a target species can present certain challenges.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
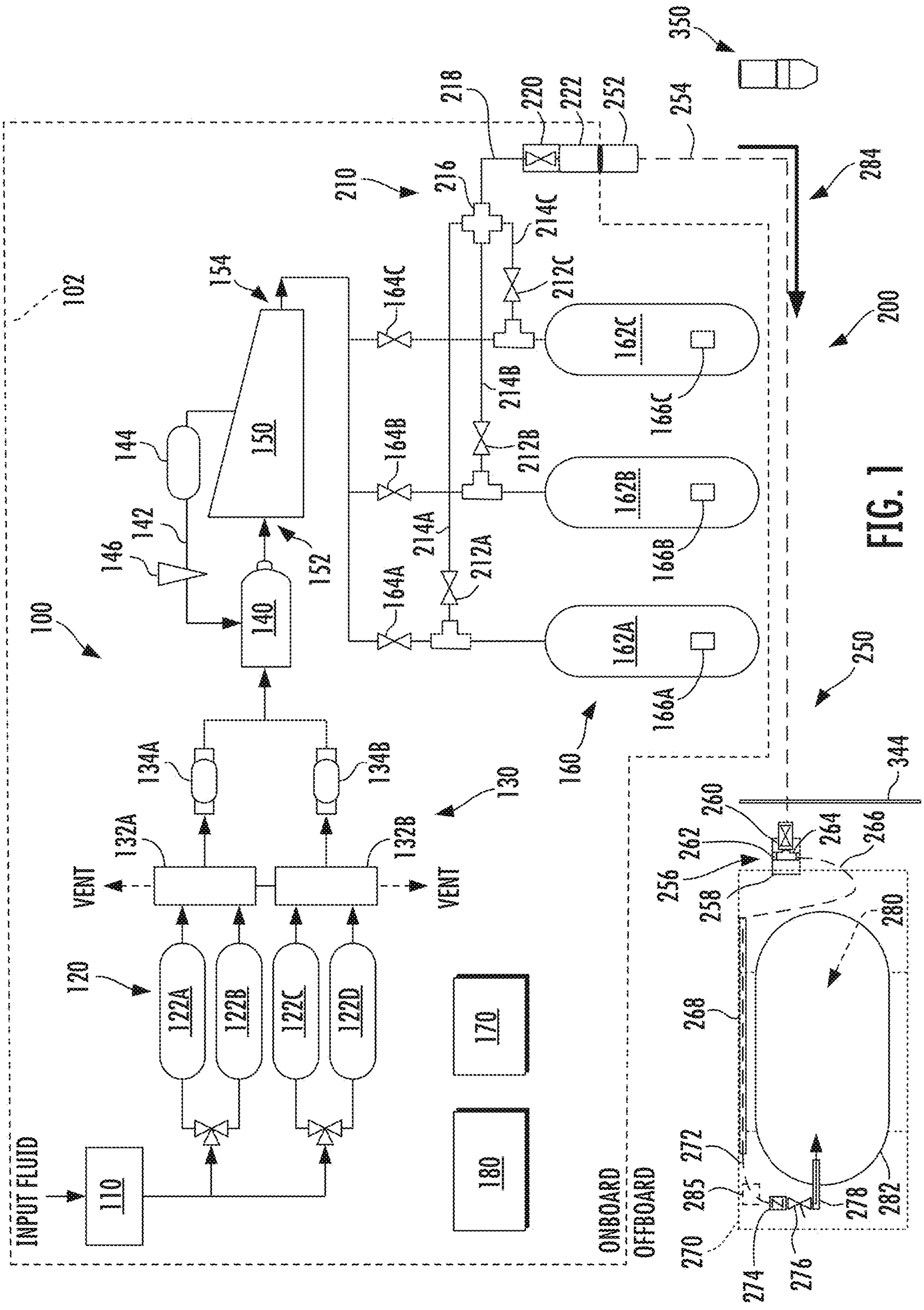
FIG. 1 provides a system diagram for a mobile capture system and an associated offload system in accordance with example embodiments of the present disclosure.

Reference now will be made in detail to embodiments of the present subject matter, one or more examples of which are illustrated in the drawings. Each example is provided by way of explanation, rather than limitation, of the technology. In fact, it will be apparent to those skilled in the art that modifications and variations can be made in the present technology without departing from the scope of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms “first”, “second”, and “third” may be used interchangeably to distinguish one component from another and are not intended to signify location or importance of the individual components.

The term “fluid” may be a gas or a liquid. The term “fluid communication” means that a fluid is capable of making the connection between the areas specified.

As used herein, the terms “upstream” and “downstream” refer to the relative direction with respect to fluid flow in a fluid pathway. For example, “upstream” refers to the direction from which the fluid flows, and “downstream” refers to the direction to which the fluid flows. The term “radially”

refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the direction that extends around the axial centerline of a particular component.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

As used herein, the term "half" or "halves" used with respect to breakaway couplings does not necessarily indicate that the halves of the noted breakaway coupling are equal in size.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Overview

An offload system is disclosed herein. In accordance with inventive aspects of the present disclosure, the offload system can be associated with and/or can be fluidly coupled with and/or form a part of a mobile capture system. The mobile capture system can be positioned onboard a mobile platform, such as a heavy-duty truck, tractor, or train. The mobile capture system can be used to capture and store a target species (e.g., carbon dioxide) from an input fluid, such as an input gas (e.g., a fluid containing combustion products, such as diesel engine exhaust and/or other combustion engine exhaust). In this regard, advantageously, the mobile capture system can reduce greenhouse gas emissions.

In some instances, it may be desirable to offload the stored target species to an offboard volume, such as to an offboard bulk tank. The offload system facilitates offloading of the target species to the offboard volume. The offload system can include features that enable the target species to be safely and efficiently offloaded to the offboard volume.

The offload system can include an onboard system and an offboard system. The onboard system is positioned onboard the mobile platform. The onboard system can facilitate discharge of the target species from one or more storage vessels of the mobile capture system in which the target species is/are stored and can direct the target species downstream to the offboard system. The onboard system can include offload valves that can be controlled to selectively allow the target species to flow from the storage vessels downstream to be offloaded. The onboard system can also include an onboard breakaway coupling that includes a part that can "break away" under a predetermined tensile force, such as when the mobile platform (e.g., a truck or train) is moved away from the offboard system while the onboard system and the offboard system are coupled with one another via respective connectors.

The offboard system is positioned offboard the mobile platform. The offboard system can include, among other things, an offboard connector that connects with a corresponding onboard connector of the onboard system. When the onboard connector and the offboard connector are coupled, the onboard system and the offboard system are fluidly coupled with one another, which allows fluid containing the target species to flow downstream from the onboard system to the offboard system. The offboard connector can be coupled with a flexible offload hose. The flexible offload hose can be in turn coupled with an offboard breakaway coupling. Like its onboard counterpart, the offboard breakaway coupling includes a part that can "break away" under a predetermined tensile force, which can prevent damage to the offboard system. In some embodiments, the offload system can include both the onboard and offboard breakaway couplings. In other embodiments, the offload system can include only the onboard breakaway coupling or only the offboard breakaway coupling.

The offboard breakaway coupling can be uniquely mounted to a breakaway mount. Particularly, the offboard breakaway coupling can be pivotably coupled with the breakaway mount so as to allow the offboard breakaway coupling to pivot about a pivot axis. In this regard, the breakaway coupling can swivel to accommodate a distance between the mobile platform (i.e., the truck's distance) and the mount point and also the direction of travel of the mobile platform. Moreover, the breakaway mount is arranged so as to be securely mounted at its bottom end to a secure structure (e.g., a beam of a tank frame upon which an offboard bulk tank is disposed) and so as to extend vertically to a predetermined height to provide a mounting platform for the offboard breakaway coupling to clear obstacles (such as a barrier wall surrounding at least a portion of an offboard bulk tank) while swiveling or pivoting about the pivot axis. The offboard system can also include an offboard volume, such an offboard bulk tank, that ultimately receives the offloaded target species.

Inventive aspects of an offload system will be provided herein.

Technical Advantages/Benefits

Variations of the technology can provide several benefits and/or advantages.

First, variations of this technology can facilitate carbon capture in a mobile setting, such as onboard a moving vehicle. Particularly, variations of this technology can facilitate offloading of carbon, which is captured and stored onboard a moving vehicle, to an offboard volume. Offloading of the carbon can reset, restore, or otherwise increase the storage capacity of storage vessels for storing additional volumes of captured carbon, which facilitates future or ongoing carbon capture and storage.

Second, variations of this technology can provide for safe offloading of a target species from an onboard volume to an offboard volume. For example, an offload system provided herein can include an onboard breakaway coupling or an offboard breakaway coupling, or both. Such breakaway couplings can provide a point or points in an offload flowpath where the system is designed to break, which can prevent damage to more complex components and/or to persons in the vicinity of the offloading operation. Accordingly, when a vehicle is moved away from the offload zone, the system is designed to specifically break at these designated points in the offload flowpath. Such breakaway couplings can include shutoff valves that automatically close in the event of a breakaway event, which can enhance safety for persons in the offload zone.

Third, variations of this technology can provide a breakaway coupling that can advantageously accommodate a vehicle's distance from the mount point and direction of travel. As one example, an offboard breakaway coupling can be pivotably mounted to a breakaway mount. In this way, the offboard breakaway coupling can pivot about a pivot axis. A unique pivot stack can be arranged to allow for pivot movement. A flexible hose can be coupled with the offboard breakaway coupling. The flexible hose can have slack to allow for pivot movement of the offboard breakaway coupling. The pivot or swivel capacity of the offboard breakaway coupling can also enhance the ease of connecting the offboard connector with the onboard connector. As another example, an onboard breakaway coupling can be pivotably mounted to an onboard breakaway mount. In this regard, the onboard breakaway coupling can pivot about a pivot axis, e.g., by way of a pivot stack. An onboard flexible hose, which can be a main offload line or a hose connected thereto, can provide slack to allow for pivot movement of the onboard breakaway coupling.

Fourth, variations of this technology can provide an offboard breakaway coupling that is clear of obstructions through its pivot or swivel range. For example, the breakaway mount to which the offboard breakaway coupling is pivotably mounted can be arranged so that the offboard breakaway coupling is positioned vertically above obstacles in the offload zone, such as a barrier that forms at least a portion of a perimeter around an offboard tank that defines the offboard volume.

Fifth, variations of this technology can provide an offboard breakaway coupling that is mounted to a secure structure. For example, the breakaway mount to which the offboard breakaway coupling is pivotably mounted can be mounted to a frame, such as a tank frame upon which the offboard tank is situated. This can prevent the breakaway mount from becoming dislodged in the event of a breakaway event.

Sixth, variations of this technology can provide certain safety control actions when a breakaway event occurs and/or connector decoupled event occurs (when the onboard and the offboard connectors become decoupled). For example, when such an event occurs, one or more control actions can be performed, such as causing the offload valves to move to a closed position, causing a display, an audio device, and/or a haptic feedback device to indicate to an operator that such an event has occurred, causing an advanced driver warning system of the vehicle to automatically apply vehicle brakes, a combination of the foregoing, etc.

Seventh, variations of this technology can provide a bleed valve along an offload flowpath that is in an improved access location.

Eighth, variations of this technology can monitor and/or determine the total amount of a target species offloaded to an offboard volume. The total amount can be a total volume, for example. The total amount can advantageously be used to estimate a new storage capacity of the onboard volume, can be used to track an operator's and/or an entity's reduction in target species emissions, and/or to automatically credit/debit a user account (e.g., the operator or an entity's account) with an exchange medium, which may beneficially enhance the operator and/or entity's ability to track emission progress relative to a threshold amount.

One or more of these variants can be included in various embodiments of the present subject matter. Moreover, any combination of the above-noted variations is contemplated.

Other benefits, advantages, and/or technical effects can be provided by the subject matter of the present disclosure.

Mobile Capture System—An Overview

FIG. 1 provides a schematic view of a mobile capture system 100 according to example embodiments of the present disclosure. The mobile capture system 100 can be mounted to a vehicle, such as a heavy duty truck, tractor, or train. As shown, the mobile capture system 100 can include, among other things, an exhaust gas conditioning system 110, a capture system 120, a regeneration module 130, an accumulator 140, a compression system 150, and a storage system 160, each of which is positioned along a flow path of an input fluid (e.g., a vehicle exhaust gas). The mobile capture system 100 can also include a computing system 170 and a user interface 180.

The mobile capture system 100 can be fluidly coupled with one or more exhaust ports of a vehicle (e.g., an exhaust manifold, turbo outlet, exhaust emission device outlet, etc.), such as wherein the exhaust port(s) are connected to the gas input of the mobile capture system 100 (e.g., an intake/intake manifold of the system, etc.), but can additionally or alternatively be configured to connect to any other suitable portion of the vehicle gas handling elements (e.g., connected to any vehicle port, pipe, and/or manifold that contains combustion products, such as any location downstream of the engine cylinders). However, the mobile capture system 100 can alternatively be utilized for other mobile and/or stationary applications (e.g., used with a ship or watercraft, a train, used with and/or connected to a stationary combustion engine, such as a fuel-powered generator, etc.).

As noted, in some examples, the mobile capture system 100 can be used with a train. Such a mobile capture system 100 can include an exhaust gas conditioning system 110, a capture system 120, a regeneration module 130, an accumulator 140, a compression system 150, and a storage system 160. Each such component can be positioned along a flow path of an input fluid (e.g., exhaust gas from a locomotive engine). The mobile capture system 100 can also include a computing system 170 and a user interface 180. In some examples, the mobile capture system 100 can be powered by one or more fuel-powered generators (e.g., diesel-powered generator). In some examples, the mobile capture system 100 can be configured to capture a target species (e.g., carbon dioxide) from a locomotive engine exhaust gas and from the exhaust gas of one or more fuel-powered generators that provide power to the mobile capture system 100.

The exhaust gas conditioning system 110 functions to remove heat and/or moisture from the input fluid. As received, many input gasses (e.g., combustion products, such as diesel exhaust) typically contain water vapor and are typically at elevated temperature (e.g., greater than 50, 60, 70, 80, 90, 100, 40-60, 60-80, and/or 80-100° C., within any suitable open or closed interval bounded by any one or more of the aforementioned values, etc.). Pre-treating the input gas with the exhaust gas conditioning system 110 can establish improved gas conditions (e.g., low humidity, temperature below a threshold temperature maximum, etc.) for efficient target species capture by the capture system 120 located downstream of the exhaust gas conditioning system 110. In some examples, the exhaust gas conditioning system 110 can function to increase energy efficiency, such as through energy capture and/or reuse (e.g., waste heat capture and/or reuse). For instance, waste heat captured upstream can be utilized downstream, e.g., for drying or dehumidifying the input gas and/or for use at the capture system 120.

The exhaust gas conditioning system 110 can include one or more heat removal systems, a condensate removal system, and a dry air system or gas dryer. The one or more heat removal systems, the condensate removal system, and the dry air system or gas dryer can be fluidly coupled with one another along the input fluid flowpath (e.g., exhaust gas flowpath). Generally, the heat removal systems function to remove heat from the input fluid, the condensate removal system functions to remove condensates from the input fluid, and the dry air system functions to dehumidify or remove moisture from the input fluid.

In some variants, the exhaust gas conditioning system 110 can be configured and can remove heat and/or moisture from the input fluid in any of the manners disclosed in U.S. application Ser. No. 18/169,944, filed 16 Feb. 2023, and titled "SYSTEM AND METHOD FOR EXHAUST GAS CONDITIONING", which is hereby incorporated by reference in its entirety.

The capture system 120 includes one or more valves and one or more capture modules that function to capture the target species (e.g., carbon dioxide) from the input fluid. In the depicted embodiment of FIG. 1, the capture system 120 includes a first capture module 122A, a second capture module 122B, a third capture module 122C, and a fourth capture module 122D. The first capture module 122A and the second capture module 122B can form a first capture pair and the third capture module 122C and the fourth capture module 122D can form a second capture pair. Each capture module can include a housing, one or more fluid ports (e.g., inlets, outlets, bidirectional ports, etc.), and a capture medium contained within the housing. The capture medium of a capture module can function to adsorb one or more target species (e.g., carbon dioxide). The adsorption is preferably selective, such as wherein the target species is preferentially adsorbed in comparison with some or all other species in the input gas. In some variants, the capture modules 122A, 122B, 122C, 122D can function to enable continuous capture of the target species, such as wherein one capture module of a capture pair performs target species capture (e.g., adsorbs $CO_2$) while the other capture module of the capture pair is regenerating (e.g., desorbing $CO_2$). The capture system 120 can harvest or capture a target species in a manner disclosed in U.S. application Ser. No. 17/683,832, filed 1 Mar. 2022, and titled "SYSTEM AND METHOD FOR MOBILE CARBON CAPTURE" (issued as U.S. Pat. No. 11,560,817 on 24 Jan. 2023), which is hereby incorporated by reference in its entirety.

The regeneration module 130 functions to selectively transport the adsorbed target species from the capture medium to (or toward) the storage system 160 and/or to vent undesired species, such as species other than the target species that are present in the input gas, to atmosphere, to another position along the flow path, and/or are otherwise discarded. The regeneration module 130 can include one or more regeneration manifolds that each include one or more valves, sensors, flow paths, etc. For instance, the regeneration module 130 of the mobile capture system 100 of FIG. 1 includes a first regeneration manifold 132A associated with the first capture pair (i.e., the first capture module 122A and the second capture module 122B) and a second regeneration manifold 132B associated with the second capture pair (i.e., the third capture module 122C and the fourth capture module 122D). In some variants, the first regeneration manifold 132A and the second regeneration manifold 132B can be fluidly coupled. In other variants, the first regeneration manifold 132A and the second regeneration manifold 132B can be fluidly decoupled.

The one or more valves of a regeneration manifold can be configured to control whether gas evacuated from a capture module is fluidly coupled to the storage system 160 or to atmosphere. In this way, the regeneration module 130, or more particularly a regeneration manifold thereof, can be controlled between a vent mode and a storage mode. In the vent mode, the gas evacuated from one of the capture modules of the capture system 120 is vented to atmosphere (and/or otherwise discarded), whereas in the storage mode, the evacuated gas is directed to and stored in the storage system 160. For example, the regeneration module 130 can be configured to operate in the vent mode during the start of a regeneration cycle (e.g., while the evacuated gas may contain a larger portion of undesired species, such as species other than the target species that are present in the input gas, which may have remained in the open volumes within the capture module), and then to switch to operation in the storage mode during a later time interval of the regeneration cycle (e.g., after the majority of undesired species have been cleared, and so the evacuated gas may contain a larger portion of the target species that desorbs from the capture medium during the regeneration process).

The regeneration module 130 can also include a vacuum system having one or more vacuum pumps. For instance, the regeneration module 130 of the mobile capture system 100 of FIG. 1 includes a first vacuum pump 134A associated with the first capture pair (i.e., the first capture module 122A and the second capture module 122B) and a second vacuum pump 134B associated with the second capture pair (i.e., the third capture module 122C and the fourth capture module 122D). Although the first vacuum pump 134A and the second vacuum pump 134B are shown separate from the first and second regeneration manifolds 132A, 132B, one or both of the vacuum pumps can be included in or can be a part of their respective regeneration manifolds.

The first vacuum pump 134A and the second vacuum pump 134B can both be operable to apply a relative negative pressure (e.g., partial vacuum, such as less than 20, 20, 25, 26, 27, 28, 29, 29.5, 29.7, 29.8, and/or greater than 29.8 inHg relative negative pressure, within any suitable open or closed interval bounded by one or more of the aforementioned values, and/or any other suitable vacuum pressure) to the interior of a capture module (e.g., to the capture medium and its surroundings within its housing). For example, the vacuum pumps can be configured to partially evacuate the housing of one of the capture modules of the capture system 120 and/or convey/urge its gaseous contents (e.g., gasses contained within the housing, gasses desorbed from the capture medium, etc.) to the storage system 160 (and/or elsewhere, such as vented to atmosphere). The regeneration module 130 can operate in a manner disclosed in U.S. application Ser. No. 17/683,832, filed 1 Mar. 2022, and titled "SYSTEM AND METHOD FOR MOBILE CARBON CAPTURE" (issued as U.S. Pat. No. 11,560,817 on 24 Jan. 2023), which is hereby incorporated by reference in its entirety.

The accumulator 140 is positioned downstream of the regeneration module 130 and upstream of the compression system 150 along the flow path of the input fluid. The accumulator 140 functions to collect or accumulate the input gas containing the target species so as to maintain pressure, reduce pressure peaks, and dampen shock, vibration, and pulsations at the inlet of a compressor of the compression system 150. In some variants, such as shown in FIG. 1, a compressor blowdown recycle line 142 can fluidly couple the accumulator 140 and the compression system 150, which allows fluid to flow from the compression system 150 back to the accumulator 140. An expansion chamber 144 and a filter 146 can be positioned along the compressor blowdown recycle line 142. The expansion chamber 144 can allow recycled fluid, which can include gas containing the target species and oil, to expand so as to reduce the pressure of the gas before returning to the accumulator 140. The filter 146 functions to remove oil from the gas containing the target species. The oil can be scavenged back to a sump of the compression system 150, for example.

The compression system 150 is positioned downstream of the accumulator 140 and upstream of the storage system 160 along the flow path of the input fluid. The compression system 150, or more specifically a compressor thereof, has an inlet 152 and an outlet 154. The compression system 150 functions to compress the input fluid containing the target species so as to increase the storage capability of the storage system 160. The compression system 150 can compress the gas containing the target species so that the target species (e.g., carbon dioxide) can be stored in a densified form. For example, the compression system 150 can compress the target species so that the target species can be stored as a compressed gas (e.g., at 30-100 bar, 30-50 bar, 45-75 bar, 70-100 bar, less than 30 bar, or greater than 100 bar, etc., preferably at or above 60 bar), can be stored as a liquid (e.g., pressurized carbon dioxide liquid at temperatures below the approximately 31.1° C. critical point of carbon dioxide, such as liquid carbon dioxide at pressures above 75 bar), can be stored as a solid (e.g., cooled carbon dioxide solid, such as carbon dioxide below −78.5° C.), and/or can be stored in any other densified form. However, the storage system 160 can alternatively store the target species in a low-density form (e.g., lightly-compressed gas).

The storage system 160 can include, among other possible components, one or more valves and one or more storage vessels. For instance, the storage system 160 of the mobile capture system 100 of FIG. 1 includes a first storage vessel 162A, a second storage vessel 162B, and a third storage vessel 162C. Each storage vessel 162A, 162B, 162C can have an associated valve 164A, 164B, 164C, or share a combined valve manifold. The valves 164A, 164B, 164C can be controlled to selectively direct or allow the compressed target species to one or more of the storage vessels 162A, 162B, 162C. Further, each storage vessel 162A, 162B, 162C can have an associated sensor 166A, 166B, 166C, such as associated pressure sensors. The sensors 166A, 166B, 166C can be used to measure a characteristic (e.g., a pressure) of the gas containing the target species held within their respective storage vessels 162A, 162B, 162C. In some embodiments, the sensors 166A, 166B, 166C can be positioned within the interior volumes of the storage vessels 162A, 162B, 162C as shown in FIG. 1. In alternative embodiments, the sensors 166A, 166B, 166C can be located in other locations, such as at the ingress/egress port of the storage vessels 162A, 162B, 162C. Although three (3) storage vessels are shown in FIG. 1, it will be appreciated that the storage system 160 can include less or more than three (3) storage vessels in other example embodiments. The storage vessels 162A, 162B, 162C can store the captured target species, e.g., until the target species can be offloaded at a later time.

The computing system 170 can include one or more processors and one or more memory devices, such as one or more non-transitory memory devices. The one or more processors and one or more memory devices can be embodied in one or more computing devices, controllers, etc. The one or more memory devices, such as one or more non-transitory computer readable medium, can store computer-readable instructions that can be executed by the one or more processors to perform operations, such as controlling operations of the mobile capture system 100. The computing system 170 can be communicatively coupled with one or more sensors (e.g., temperature sensors, pressure sensors, mass flow sensors, etc.) via one or more communication links (e.g., wired and/or wireless communication links). For instance, the computing system 170 can be communicatively coupled with the sensors 166A, 166B, 166C of the storage system 160. In some variants, the computing system 170 can be communicatively coupled with a vehicle computing system (e.g., an electronic engine controller of a heavy duty truck), which allows for communication therebetween. The computing system 170 can be configured as provided in FIG. 19 and the accompanying text.

The user interface 180, which can be communicatively coupled with the computing system 170 and other devices, can include, without limitation, one or more displays (e.g., a touchscreen, display panels, etc.), one or more speakers (e.g., for receiving audible notifications and/or alerts), one or more microphones (e.g., for providing voice commands), haptic feedback devices (e.g., for providing notifications, warnings, etc. to a user, such as by vibration with an electric machine), human-computer interaction devices (e.g., keyboards, mouse, etc.), among other possible devices. As one example, at least some devices of the user interface 180 can be provided onboard the vehicle 102 (e.g., within a cab thereof). In some implementations, the user interface 180 can be communicatively coupled with one or more components of an offload system, e.g., to notify a user of a status of an offload operation.

Offload System

As further shown in FIG. 1, the mobile capture system 100 can be associated with and/or can be selectively coupled with an offload system 200. The offload system 200 functions generally to facilitate offloading of a captured target species from the mobile capture system 100. Particularly, the offload system 200 functions to offload the target species stored in the storage vessels 162A, 162B, 162C to an offboard volume, such as to an offboard bulk tank. Among other benefits, offloading the target species from the storage vessels 162A, 162B, 162C resets, restores, or otherwise increases the storage capacity of the storage vessels 162A, 162B, 162C. In this way, additional or future captured volumes of the target species can be stored therein, and ultimately offloaded by the offload system 200. Moreover, other benefits may be realized by offloading the target species. For instance, private and/or governmental entities may provide credits for capturing/offloading the target species, the offloaded target species can be stored safely offboard (e.g., underground), sold to end-users, and/or used in advantageous ways. Further, the captured/offloaded target species can be prevented from escaping to the atmosphere and/or stratosphere, which may be beneficial to the environment.

As depicted in FIG. 1, the offload system 200 includes an onboard system 210 and an offboard system 250. The onboard system 210 is positioned onboard a same mobile platform (e.g., a truck, tractor, or train) to which the mobile capture system 100 is mounted, or at least the same mobile platform to which the storage system 160 is mounted. For instance, for the depicted embodiment of FIG. 1, the mobile capture system 100 is positioned onboard a vehicle 102, which can be a heavy-duty truck, tractor, or train, for example. The onboard system 210 is also shown positioned onboard the vehicle 102. In contrast, the offboard system 250 is positioned offboard the mobile platform to which the mobile capture system 100 is mounted (e.g., offboard the truck, tractor, or train to which the mobile capture system 100 is mounted). For instance, as illustrated in FIG. 1, the offboard system 250 is shown positioned offboard the vehicle 102.

Onboard System

The onboard system 210 can include features that selectively allow the target species stored in the storage system 160 to be discharged therefrom, or rather, to selectively allow offloading of the target species from the storage system 160. Particularly, the onboard system 210 can include offload valves or a valve manifold that can be independently controlled to permit offloading of the target species from their respective storage vessels 162A, 162B, 162C. For the depicted embodiment of FIG. 1, the onboard system 210 includes a first offload valve 212A, a second offload valve 212B, and a third offload valve 212C. The first, second, and third offload valves 212A, 212B, 212C can be controlled (e.g., by the computing system 170) to selectively offload the target species from their respective first, second, and third storage vessels 162A, 162B, 162C. The offload valves 212A, 212B, 212C can be electronically-controlled valves, for example. During an offload operation, the first, second, and third offload valves 212A, 212B, 212C can be controlled to open all at once, one at a time, sequentially, two at once, and/or in other suitable manners.

In some embodiments, the first, second, and third offload valves 212A, 212B, 212C can be controlled to open simultaneously to provide the highest offload flowrate of gas containing the target species possible. In other embodiments, the first, second, and third offload valves 212A, 212B, 212C can be controlled according to a pressure within their respective storage vessels 162A, 162B, 162C. During an offload operation, the valves 164A, 164B, 164C can each be controlled to a closed position. In other embodiments, one or more one-way valves can be positioned so as to prevent gas containing the target species from flowing from the storage system 160 back to the compression system 150.

The first offload valve 212A is positioned along a first offload line 214A that is fluidly coupled with the first storage vessel 162A. The second offload valve 212B is positioned along a second offload line 214B that is fluidly coupled with the second storage vessel 162B. The third offload valve 212C is positioned along a third offload line 214C that is fluidly coupled with the third storage vessel 162C. The first, second, and third offload lines 214A, 214B, 214C meet at and are fluidly coupled with an offload manifold 216 or junction. A main offload line 218 is connected to an outlet of the offload manifold 216. Flows of fluid containing the target species can flow from their respective storage vessels 162A, 162B, 162C, through their respective offload valves 212A, 212B, 212C (when opened) and along their respective lines 214A, 214B, 214C to the offload manifold 216, where the flows can mix and flow downstream along the main offload line 218.

In some embodiments, the onboard system 210 can include one or more safety features for preventing damage to components of the offload system 200, the mobile capture system 100, and/or surrounding objects or persons. For instance, as shown in FIG. 1, the onboard system 210 includes an onboard breakaway coupling 220. Generally, the onboard breakaway coupling 220 includes a first half and a second half configured to be connected during normal offload operation but capable of separation (or breaking away) under a predetermined tensile force, which may occur, for example, when the vehicle 102 moves away from the offload system 200 too far a distance or at too rapid of a rate.

An inlet of the onboard breakaway coupling 220 is connected to the main offload line 218 and an outlet of the onboard breakaway coupling 220 is connected to an onboard connector 222. The onboard connector 222 can be connected to an offboard connector 252 of the offboard system 250, e.g., via a threaded engagement, a push-to-connect fitting, etc. The onboard connector 222 can be removably connectable with the offboard connector 252. That is, the onboard connector 222 can be connected or disconnected from the offboard connector 252 as desired. The offboard connector 252 can be coupled with an offload hose 254 of the offboard system 250. The offload hose 254 or line can be formed of a flexible material to allow for the offboard connector 252 to be more easily confronted with or located relative to the onboard connector 222 for connection purposes. When connected or coupled, the onboard connector 222 and the offboard connector 252 provide a coupling interface between the onboard system 210 and the offboard system 250. Stated another way, when the onboard connector 222 and the offboard connector 252 are connected or coupled, the onboard system 210 can become fluidly coupled with the offboard system 250. When the onboard connector 222 and the offboard connector 252 are not connected or coupled, the onboard system 210 is not fluidly coupled with the offboard system 250. Accordingly, the onboard system 210 and the offboard system 250 can be selectively fluidly coupled with one another.

Figure 2:
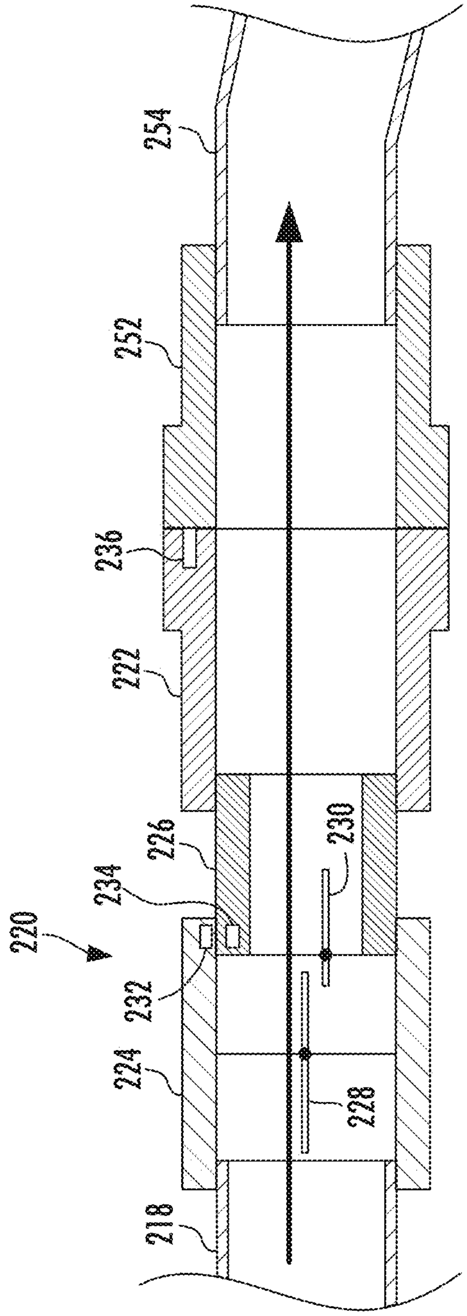
FIG. 2 provides a schematic cross-sectional view of an onboard breakaway coupling of the offload system of FIG. 1, with the onboard breakaway coupling shown in a normal offload operation.
Figure 3:
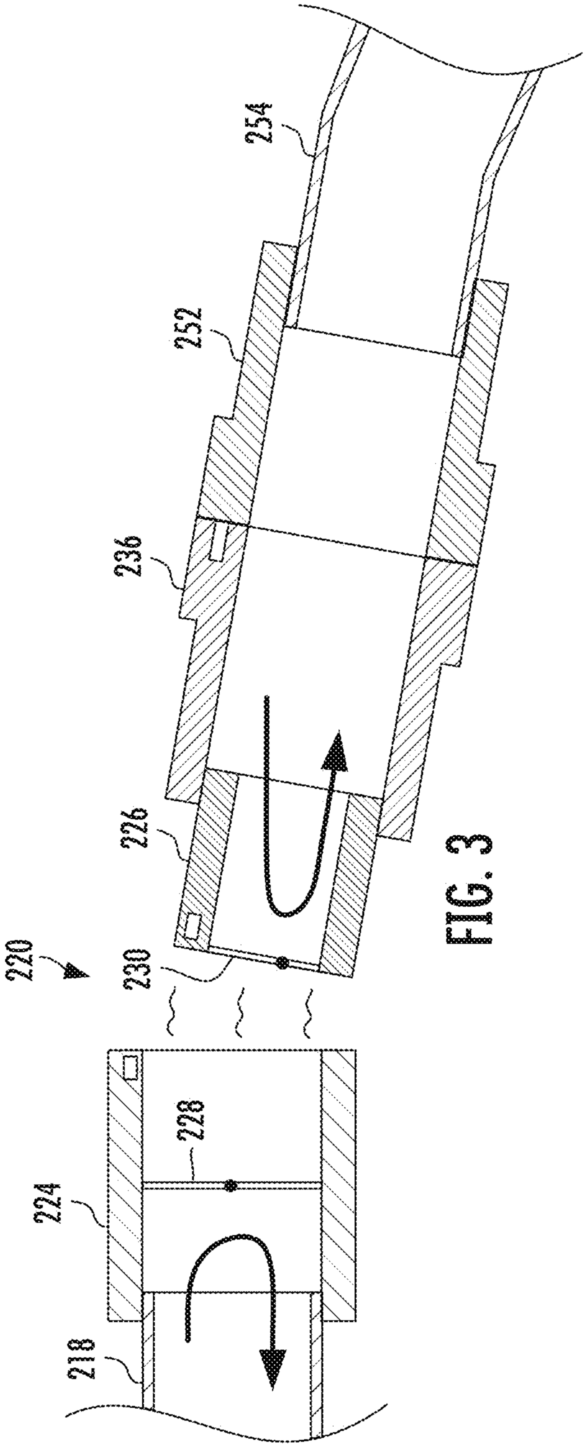
FIG. 3 provides a schematic cross-sectional view of the onboard breakaway coupling of FIG. 2, with a portion of the onboard breakaway coupling breaking away in response to a predetermined tensile force.
Figure 4:
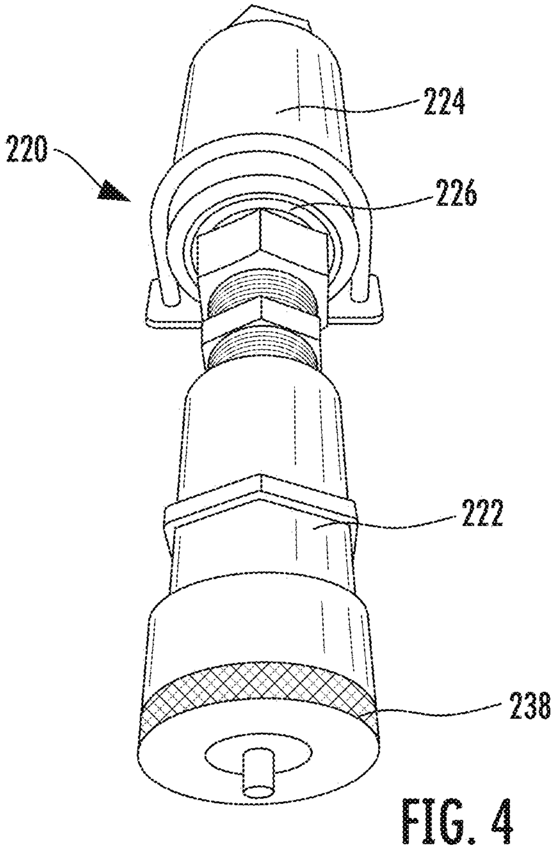
FIG. 4 provides a perspective view of an onboard breakaway coupling coupled with an onboard connector in accordance with embodiments of the present disclosure.

With reference now to FIGS. 2, 3, and 4, FIGS. 2 and 3 depict schematic cross-sectional views of the coupling interface between the onboard system 210 and the offboard system 250. FIG. 2 depicts the onboard breakaway coupling 220 configured in a normal offload operation while FIG. 3 depicts the onboard breakaway coupling 220 having a portion “breaking away” in response to a predetermined tensile force (e.g., greater than or equal to 500 Newtons, greater than or equal to 600 Newtons, etc.). FIG. 4 provides a perspective view of an onboard breakaway coupling coupled with an onboard connector, wherein these components are decoupled from the main offload line 218.

As shown in FIG. 2, the main offload line 218 is fluidly coupled with the onboard breakaway coupling 220. The onboard breakaway coupling 220 includes a first half 224 and a second half 226 positioned downstream of the first half 224. The first half 224 can be deemed the “non-breakaway half” or “base half” of the onboard breakaway coupling 220. The second half 226 can be deemed the “breakaway half” of the onboard breakaway coupling 220. The first half 224 is connected to the main offload line 218, e.g., via a threaded engagement. The first half 224 has a first valve 228, which is shown in the open position in FIG. 2. The second half 226 has a second valve 230, which is shown in the open position in FIG. 2. The first and second valves 228, 230 can be integrated shutoff valves, for example. The onboard connector 222 is connected to the second half 226 of the onboard breakaway coupling 220, e.g., via a threaded engagement. A downstream end of the onboard connector 222 is connected to the offboard connector 252. A downstream end of the offboard connector 252 is connected to the offload hose 254. As both the first valve 228 and the second valve 230 are in their respective open positions, a gas containing the target species can flow downstream along the main offload line 218, through the first half 224 and the second half 226 of the onboard breakaway coupling 220, through the onboard connector 222, through the offboard connector 252, downstream along the offload hose 254 and ultimately to an offboard volume.

As shown in FIG. 3, a predetermined tensile force has been applied, and consequently, the second half 226 of the onboard breakaway coupling 220 has "broken away" from the first half 224. Notably, the onboard breakaway coupling 220 is configured so that the first valve 228, the second valve 230, or both move to a closed position in the event that the second half 226 breaks away from the first half 224. Accordingly, as shown in FIG. 3, the first valve 228 is shown in the closed position, which prevents or reduces gas containing the target species from escaping to the atmosphere. Stated differently, the first valve 228 functions as a mechanical stop to prevent or reduce gas containing the target species flowing along the main offload line 218 to escape to the atmosphere. Such a mechanical stop not only provides safety to nearby operators and objects by preventing contact with a highly compressed gas, but the gas containing the target species can remain captured instead of leaking to the atmosphere.

As further illustrated in FIG. 3, in this example embodiment, the second valve 230 is shown in the closed position, which prevents or reduces the gas containing the target species from escaping from the second half 226 to the atmosphere. Stated another way, the second valve 230 functions as a mechanical stop to prevent or reduce gas containing the target species from reversing direction and flowing out of the second half 226 to the atmosphere. Like the mechanical stop provided by the first valve 228, the mechanical stop provided by the second valve 230 provides safety to nearby operators and objects and also keeps the target species contained.

In some example embodiments, optionally, the onboard breakaway coupling 220 can include a means for detecting when the second half 226 has broken away from the first half 224. By way of example, for the depicted embodiment of FIGS. 2 and 3, the first half 224 includes a proximity sensor 232 and the second half 226 includes a magnet 234. In alternative embodiments, the first half 224 can include the magnet and the second half 226 can include the proximity sensor 232. Further, in other embodiments, the onboard breakaway coupling 220 can include other types of sensing devices capable of determining when the second half 226 has broken away from the first half 224, such as an optical sensor.

In FIG. 2, the proximity sensor 232 is shown within a proximity range of the magnet 234, and consequently, it may be determined that the second half 226 has not broken away from the first half 224, or rather, that the onboard breakaway coupling 220 is configured for normal offload operation. One or more signals indicating this status can be sent, e.g., to the computing system 170 (FIG. 1). In FIG. 3, the second half 226 has broken away from the first half 224. Thus, the proximity sensor 232 is no longer within the proximity range of the magnet 234. Accordingly, it may be determined that the second half 226 has broken away from the first half 224. One or more signals indicating the status can be sent from the proximity sensor 232, e.g., to the computing system 170.

Based at least in part on the one or more signals indicating that the second half 226 has broken away from the first half 224, one or more processors of the computing system 170 (FIG. 1) can perform or cause one or more control actions, such as causing the offload valves 212A, 212B, 212C to move to a closed position, causing a display to indicate to an operator that a breakaway event has occurred, causing an audio device (e.g., a stereo system of the vehicle 102 (FIG. 1)) to indicate to an operator that a breakaway event has occurred, causing a haptic feedback device (e.g., causing a steering wheel of the vehicle to vibrate, a cell phone to vibrate, etc.) to indicate to an operator that a breakaway event that has occurred, causing an advanced driver warning system of the vehicle 102 to automatically apply vehicle brakes, a combination of the foregoing, etc.

In some further embodiments, the onboard connector 222 or the offboard connector 252, or both can include means for detecting when the onboard connector 222 is connected to the offboard connector 252. By way of example, for the depicted embodiment of FIGS. 2 and 3, the onboard connector 222 includes a sensor 236 that is configured to detect when the onboard connector 222 is connected to the offboard connector 252. As one example, the sensor 236 can be an optical sensor. As another example, the sensor 236 can be a proximity sensor magnetically couplable to a magnet disposed within the offboard connector 252.

In some embodiments, one or more signals indicating that the onboard connector 222 is connected to the offboard connector 252 can be routed from the sensor 236 to, e.g., the computing system 170 (FIG. 1). In such embodiments, one or more processors of the computing system 170 can be configured to cause one or more of the offload valves 212A, 212B, 212C, the first valve 228, and the second valve 230 to move to an open position in response to the one or more signals indicating that the onboard connector 222 is connected to the offboard connector 252. In some further embodiments, in addition to opening one or more of the valves, the one or more processors of the computing system 170 can be configured to provide a notification (e.g., to an operator) indicating that the onboard connector 222 is connected to the offboard connector 252.

In response to one or more signals indicating that the onboard connector 222 is not connected to the offboard connector 252, as detected by the sensor 236, the one or more processors of the computing system 170 can be configured to close one or more of the offload valves 212A, 212B, 212C, the first valve 228, and/or the second valve to move to a closed position. In some further embodiments, in addition to closing one or more of the valves, the one or more processors of the computing system 170 can be configured to provide a notification (e.g., to an operator) indicating that the onboard connector 222 is not connected to the offboard connector 252.

In some embodiments, during initialization of an offload operation, the offload valves 212A, 212B, 212C can be automatically opened in response to the onboard connector 222 being connected to the offboard connector 252, wherein the connection of the connectors 222, 252 is detected by the sensor 236. In other embodiments, the offload valves 212A, 212B, 212C can be opened in response to an operator input, such as input on a touchscreen indicated that the operator has connected the connectors 222, 252.

In instances when an offloading operation is not in progress, the onboard connector 222 can be capped with a cap 238, e.g., as shown in FIG. 4. The cap 238 can be threaded onto the onboard connector 222 or otherwise secured thereto.

Figure 5:
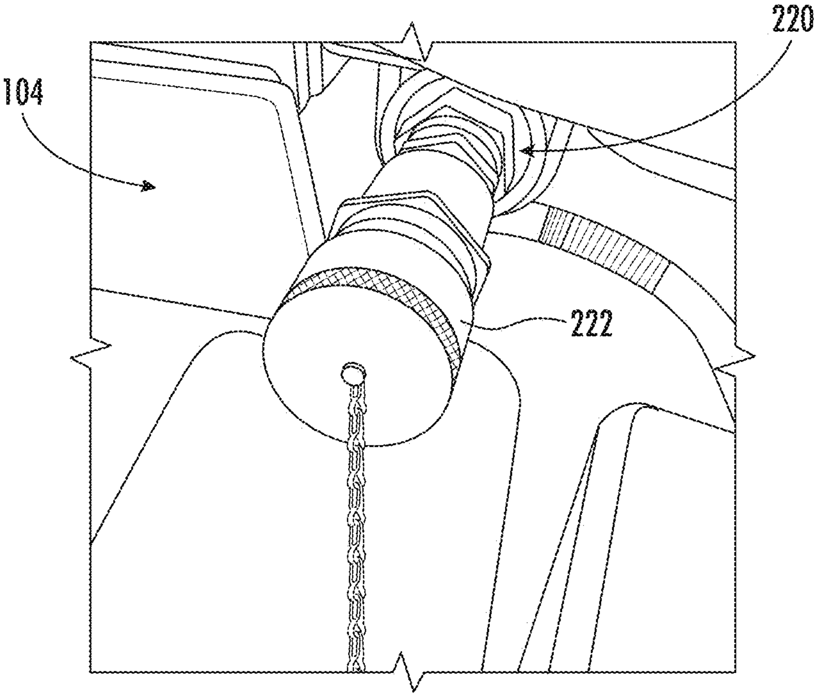
FIG. 5 provides a perspective view of an onboard breakaway coupling and onboard connector mounted rigidly perpendicular to a primary direction of motion of a vehicle in accordance with embodiments of the present disclosure.

In some further embodiments, as shown in FIG. 5, the onboard breakaway coupling 220 is oriented or mounted rigidly perpendicular to a primary direction of motion (e.g., a forward or backward motion) of the vehicle 102 to which the mobile capture system 100 and the onboard system 210 are positioned onboard. The perpendicular arrangement facilitates clean breakaways and prevents or reduces the chance that the offload hose 254 would become taut and break. In other embodiments, the onboard breakaway coupling 220 can be pivotably mounted or pivotably coupled to a swivel or other type of moving interface to allow for relative movement of the coupling 220 with respect to the vehicle 102. As further shown in FIG. 5, the onboard breakaway coupling 220 and the onboard connector 222 can be mounted adjacent to a cab 104 of the vehicle 102 (FIG. 1).

Offboard System

With reference again to FIG. 1, the offboard system 250 will now be described in greater detail. In addition to the offboard connector 252 and the offload hose 254, the offboard system 250 can include an offboard breakaway assembly 256. The offboard breakaway assembly 256 can include a breakaway mount 258 to which an offboard breakaway coupling 260 can be pivotably mounted or pivotably coupled. The offload hose 254 is coupled with an upstream end of the offboard breakaway coupling 260. The downstream end of the offboard breakaway coupling 260 can be coupled with an inlet of a connector 264, which is a tee fitting in the depicted embodiment of FIG. 1.

Optionally, a bleed fitting 262 can be mounted to the breakaway mount 258 as well. For instance, the bleed fitting 262 can be coupled with a first outlet of the connector 264. The bleed fitting 262 can be used to bleed out gas containing the target species from the lines of the offload system 200, e.g., for maintenance purposes. The bleed fitting 262 can be controlled or configured to bleed out or discharge gas containing the target species in a specific direction, which may beneficially keep operators and other objects safe from damage in the event it is desirable to remove gas containing the target species from the lines of the offload system 200. Indeed, the gas containing the target species can flow along the lines of the offload system 200 at relatively cold temperatures, such as at negative forty degrees Celsius (−40° C.). Mounting the bleed fitting 262 on the breakaway mount 258 can provide enhanced accessibility to the bleed fitting 262, among other potential benefits.

A flexible hose 266, which has slack to allow for pivoting or swivel movement of the offboard breakaway coupling 260 relative to the breakaway mount 258, is located downstream of the offboard breakaway coupling 260. Specifically, the flexible hose 266 is coupled with a second outlet of the connector 264. In alternative embodiments, the downstream end of the offboard breakaway coupling 260 can be directly connected to the flexible hose 266. The flexible hose 266 is fluidly coupled with an upstream end of a hard line 268. The hard line 268 can be a stainless steel hard line, for example. The hard line 268 can be formed of other materials in other example embodiments. The hard line 268 can be mounted to a beam of a tank frame 270, for example. A downstream end of the hard line 268 can be fluidly coupled with a tank flexible hose 272. In another embodiment, the flexible hose 266 can replace the hard line 268 and extend from the connector 264 to the tank flexible hose 272, or yet further also include the flexible hose 272.

A check valve 274, which can be a one-way check valve, can be positioned along the tank flexible hose 272 and/or downstream thereof. The check valve 274 ensures that the gas containing the target species does not reverse direction and flow back toward the offboard breakaway coupling 260. In some embodiments, a manual shutoff valve 276 can be positioned upstream of a fluid line 278. The manual shutoff valve 276 can be manually manipulated by an operator to stop the gas containing the target species from flowing downstream thereof. In some embodiments, optionally, the manual shutoff valve 276 is not included. The fluid line 278 can be fluidly coupled with an offboard volume 280 defined by an offboard tank 282. However, in other embodiments, the offboard volume 280 can be defined by other suitable apparatuses capable of holding a gas containing the target species. In yet other embodiments, the offboard volume 280 can be fluidly coupled to the hard line 268 without inclusion of the tank flexible hose 272. That is, the hard line 268 may be fluidly coupled directly to the offboard volume 280.

The offboard volume 280 can be defined by a stationary tank or a tank mounted to another mobile platform. For instance, in some embodiments, the offboard volume 280 can be defined by one or more tanks positioned onboard another or a second vehicle, such as another truck, ship, or train, wherein the second vehicle is a vehicle other than the vehicle 102 to which the mobile capture system 100 and the onboard system 210 are mounted.

Generally, when the onboard system 210 and the offboard system 250 are fluidly coupled with one another (e.g., by connecting the offboard connector 252 and the onboard connector 222 and opening the noted valves), an offload flowpath 284 along which the fluid containing the target species can flow can be defined as extending from the storage vessels 162A, 162B, 162C of the mobile capture system 100 to the offboard volume 280. Accordingly, during an offload operation, the fluid containing the target species stored in the storage vessels 162A, 162B, 162C can flow from an onboard volume (or one or more onboard volumes) to an offboard volume (or one or more offboard volumes).

For the depicted embodiment of FIG. 1, for instance, the fluid containing the target species can flow downstream along the offload flowpath 284 from one or more of the storage vessels 162A, 162B, 162C, along one or more of the offload lines 214A, 214B, 214C and through the respective offload valves 212A, 212B, 212C, to the offload manifold 216 and downstream along the main offload line 218, through the onboard breakaway coupling 220 and connected onboard connector 222 and offboard connector 252, downstream along the offload hose 254 and through the offboard breakaway coupling 260 and the connector 264, through the flexible hose 266, the hard line 268, and the tank flexible hose 272, downstream through the check valve 274 and the manual shutoff valve 276, and along the fluid line 278 into the offboard volume 280 defined by the offboard tank 282.

Further, in some embodiments, optionally, one or more pumps can be positioned along the offload flowpath 284 for urging or moving the target species from the storage system 160 of the mobile capture system 100 to the offboard volume 280. As one example, a pump 285 can be positioned along the offload flowpath 284 just upstream of the check valve 274, e.g., as shown in FIG. 1. The pump 285 can be controlled, e.g., based at least in part on the pressure of the fluid containing the target species within the pressure vessels 162A, 162B, 162C. Advantageously, with the pump 285 activated, fluid containing the target species can be offloaded in the event the pressure within the storage vessels 162A, 162B, 162C is less than the pressure within the offboard volume 280 and/or to improve the flowrate of the fluid containing the target species to the offboard volume 280, among other instances where urging the fluid containing the target species may be helpful. In some embodiments, the offload system 200 can include a bypass line that allows the pump 285 to be bypassed when not in use.

Various components of the offboard system 250 will be described in greater detail below.

In some embodiments, the offboard system 250 can include one or more safety features for preventing damage to components of the offload system 200, the mobile capture system 100, and/or surrounding objects or persons. For instance, as noted above, the offboard system 250 can include the offboard breakaway coupling 260 depicted in FIG. 1. Generally, the offboard breakaway coupling 260 includes a first half and a second half configured to be connected during normal offload operation but capable of separation (or breaking away) under a predetermined tensile force (e.g., greater than or equal to 500 Newtons, greater than or equal to 600 Newtons, etc.), which may occur, for example, when the vehicle 102 moves away from the offload system 200 too far a distance or at too rapid of a rate. That is, the second half is capable of breaking away from the first half under a predetermined tensile force.

In some embodiments, particularly where the offload system 200 includes both the onboard breakaway coupling 220 and the offboard breakaway coupling 260, the predetermined tensile force required for the second half to break away from the first half of the offboard breakaway coupling 260 is less than the predetermined tensile force required for the second half 226 (FIGS. 2 and 3) to break away from the first half 224 (FIGS. 2 and 3) of the onboard breakaway coupling 220.

Figure 6:
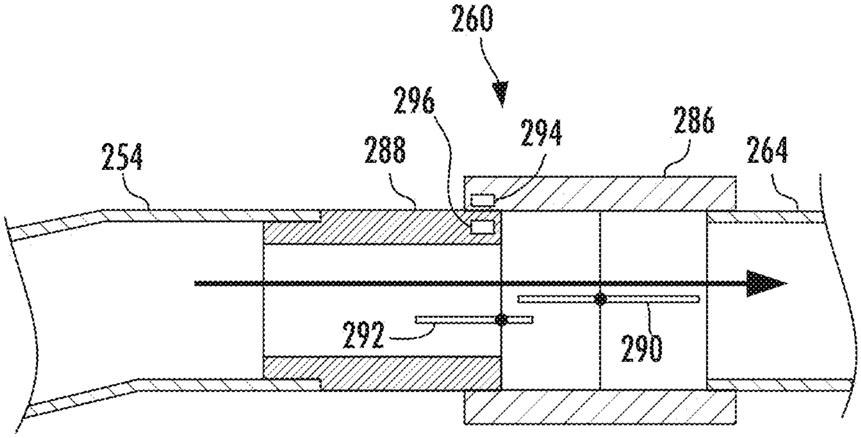
FIG. 6 provides a schematic cross-sectional view of an offboard breakaway coupling configured in a normal offload operation in accordance with embodiments of the present disclosure.
Figure 7:
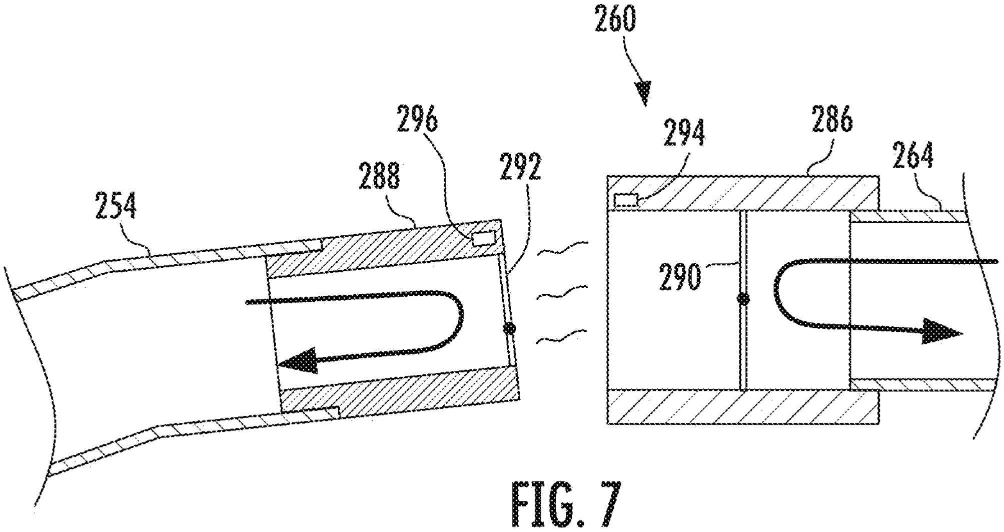
FIG. 7 provides a schematic cross-sectional view of the offboard breakaway coupling of FIG. 6, with a portion of the offboard breakaway coupling breaking away in response to a predetermined tensile force.
Figure 14:
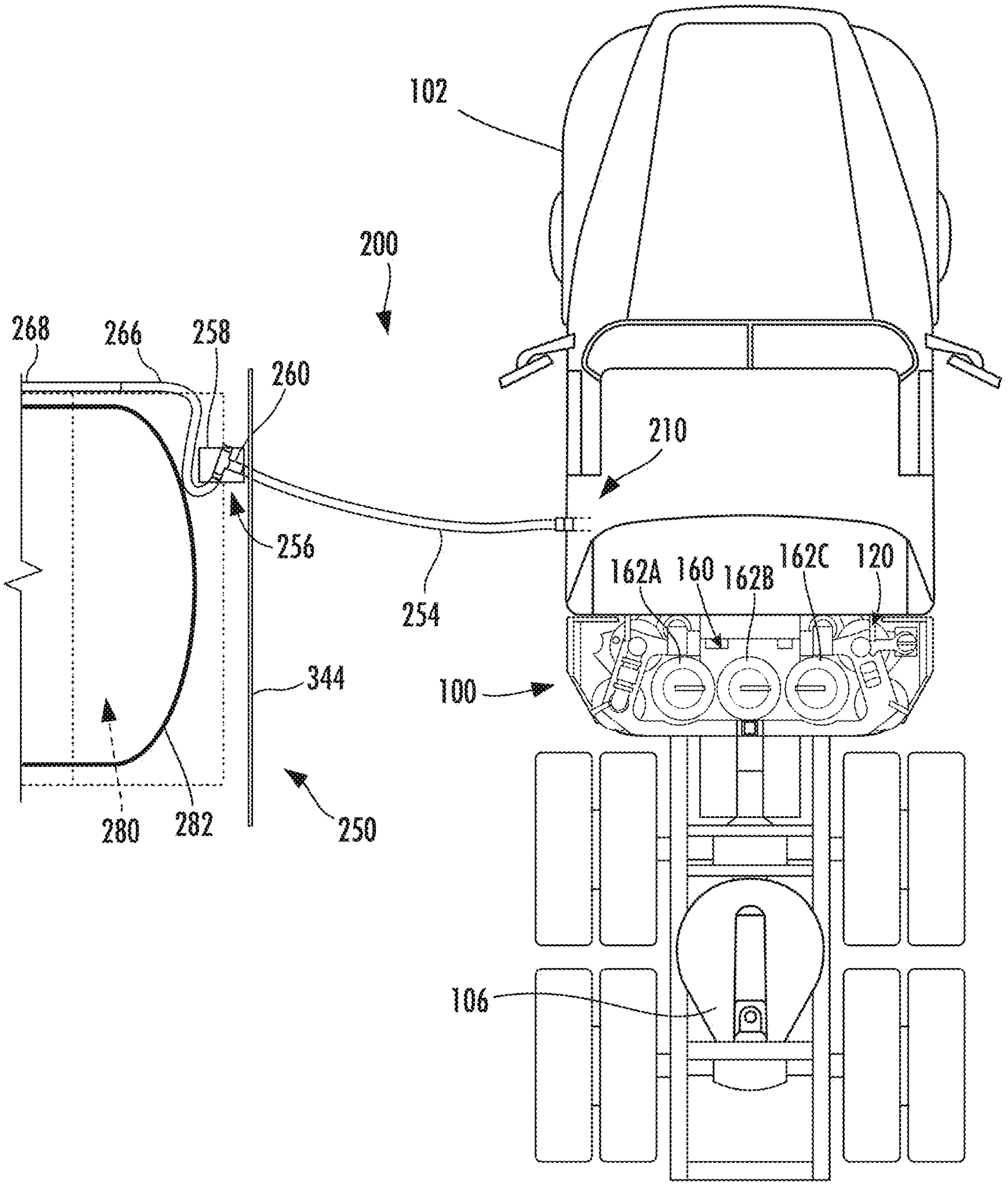
FIG. 14 provides a top plan view of a vehicle positioned for performing a normal offload operation.
Figure 15:
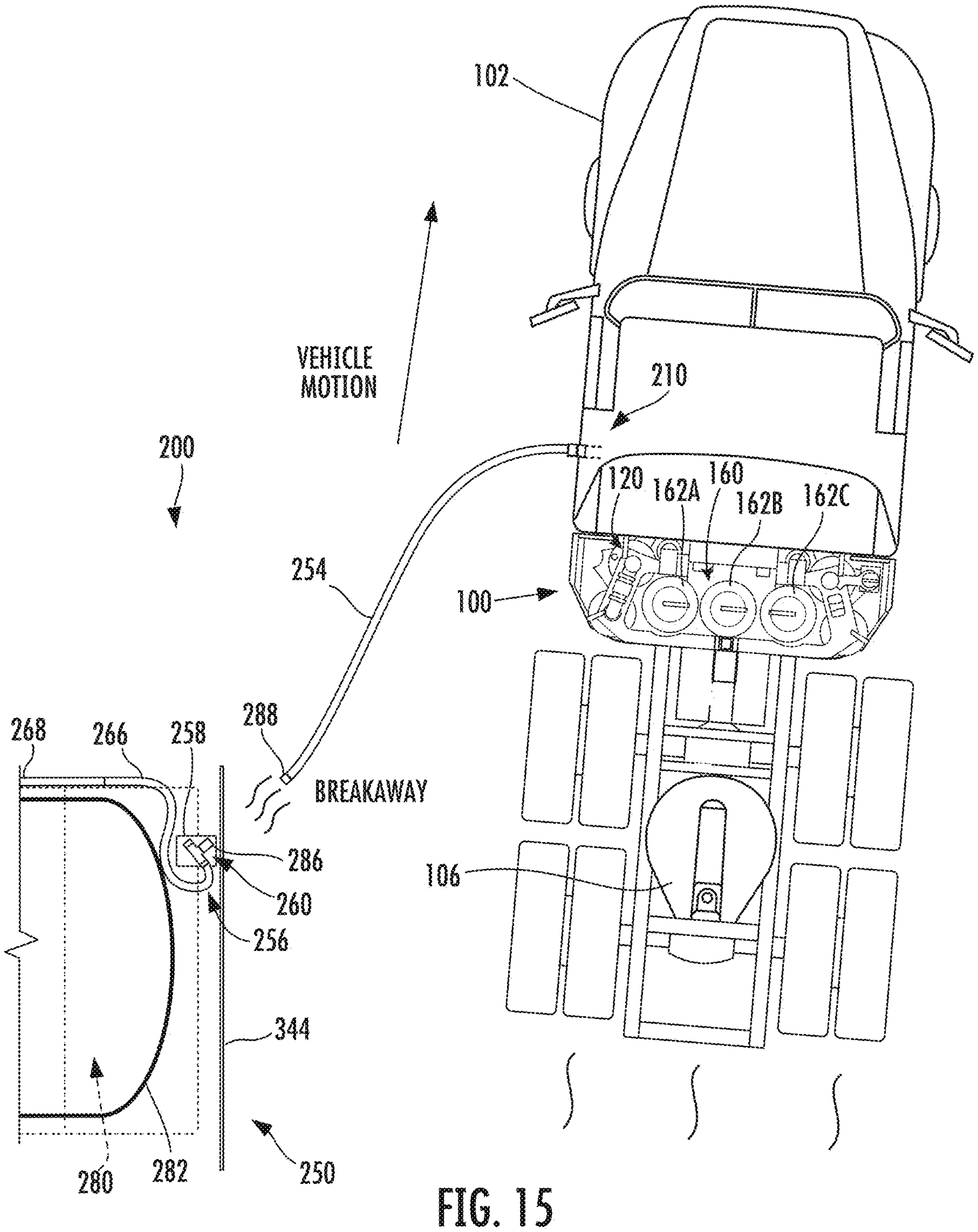
FIG. 15 provides a top plan view of the vehicle of FIG. 14 moving away from an offboard system so as to cause a breakaway event.

FIGS. 6 and 7 provide schematic cross-sectional views of the offboard breakaway coupling 260 configured in a normal offload operation (FIG. 6; see also FIG. 14) and experiencing a break away event in response to a predetermined tensile force (FIG. 7; see also FIG. 15).

As shown in FIG. 6, the offload hose 254 is fluidly coupled with the offboard breakaway coupling 260. The offboard breakaway coupling 260 includes a first half 286 and a second half 288 positioned upstream of the first half 286. The first half 286 can be deemed the "non-breakaway half" or the "base half" of the offboard breakaway coupling 260. The second half 288 can be deemed the "breakaway half" of the offboard breakaway coupling 260. The second half 288 is connected to the offload hose 254, e.g., via a threaded engagement. The first half 286 is connected to the connector 264, e.g., via a threaded engagement.

The first half 286 has a first valve 290, which is shown in the open position in FIG. 6. The second half 288 has a second valve 292, which is shown in the open position in FIG. 6. The first and second valves 290, 292 can be integrated shutoff valves, for example. As both the first valve 290 and the second valve 292 are in their respective open positions in FIG. 6, a fluid containing the target species can flow downstream along the offload hose 254 (e.g., from the onboard system 210), through the second half 288 and the first half 286 of the offboard breakaway coupling 260 and ultimately downstream to the offboard volume 280 (FIG. 1).

As shown in FIG. 7, a predetermined tensile force has been applied, and consequently, the second half 288 of the offboard breakaway coupling 260 has "broken away" from the first half 286. Notably, the offboard breakaway coupling 260 is configured so that the first valve 290, the second valve 292, or both move to a closed position in the event that the second half 288 breaks away from the first half 286. Accordingly, as shown in FIG. 7, the second valve 292 is shown in the closed position, which prevents or reduces fluid containing the target species from escaping to the atmosphere. Stated differently, the second valve 292 functions as a mechanical stop to prevent or reduce fluid containing the target species flowing along the offload hose 254 to escape to the atmosphere. Such a mechanical stop not only provides safety to nearby operators and objects by preventing contact with a highly compressed fluid, but the fluid containing the target species can remain captured instead of leaking to the atmosphere.

As further illustrated in FIG. 7, in this example embodiment, the first valve 290 is shown in the closed position, which prevents or reduces the fluid containing the target species from escaping from the first half 286 to the atmosphere. Stated another way, the first valve 290 functions as a mechanical stop to prevent or reduce fluid containing the target species from reversing direction and flowing out of the first half 286 to the atmosphere. Like the mechanical stop provided by the second valve 292, the mechanical stop provided by the first valve 290 provides safety to nearby operators and objects and also keeps the target species contained.

In some example embodiments, optionally, the offboard breakaway coupling 260 can include a means for detecting when the second half 288 has broken away from the first half 286. By way of example, for the depicted embodiment of FIGS. 6 and 7, the first half 286 includes a proximity sensor 294 and the second half 288 includes a magnet 296. In alternative embodiments, the first half 286 can include the magnet and the second half 288 can include the proximity sensor 294. Further, in other embodiments, the offboard breakaway coupling 260 can include other types of sensing devices capable of determining when the second half 288 has broken away from the first half 286, such as an optical sensor.

In FIG. 6, the proximity sensor 294 is shown within a proximity range of the magnet 296, and consequently, it may be determined that the second half 288 has not broken away from the first half 286, or rather, that the offboard breakaway coupling 260 is configured for normal offload operation. One or more signals indicating this status can be sent, e.g., to the computing system 170 (FIG. 1). In FIG. 7, the second half 288 has broken away from the first half 286. Thus, the proximity sensor 294 is no longer within the proximity range of the magnet 296. Accordingly, it may be determined that the second half 288 has broken away from the first half 286. One or more signals indicating the status can be sent from the proximity sensor 294, e.g., to the computing system 170.

Based at least in part on the one or more signals indicating that the second half 288 has broken away from the first half 286, one or more processors of the computing system 170 (FIG. 1) can perform or cause one or more control actions, such as causing the offload valves 212A, 212B, 212C to move to a closed position, causing a display to indicate to an operator that a breakaway event has occurred, causing an audio device (e.g., a stereo system of the vehicle 102 (FIG. 1)) to indicate to an operator that a breakaway event has occurred, causing a haptic feedback device to indicate to an operator that a breakaway event that has occurred, causing an advanced driver warning system of the vehicle 102 to automatically apply vehicle brakes, cause a warning notification to sound at a facility at which the offboard tank 282 is located, a combination of the foregoing, etc.

Figure 8A:
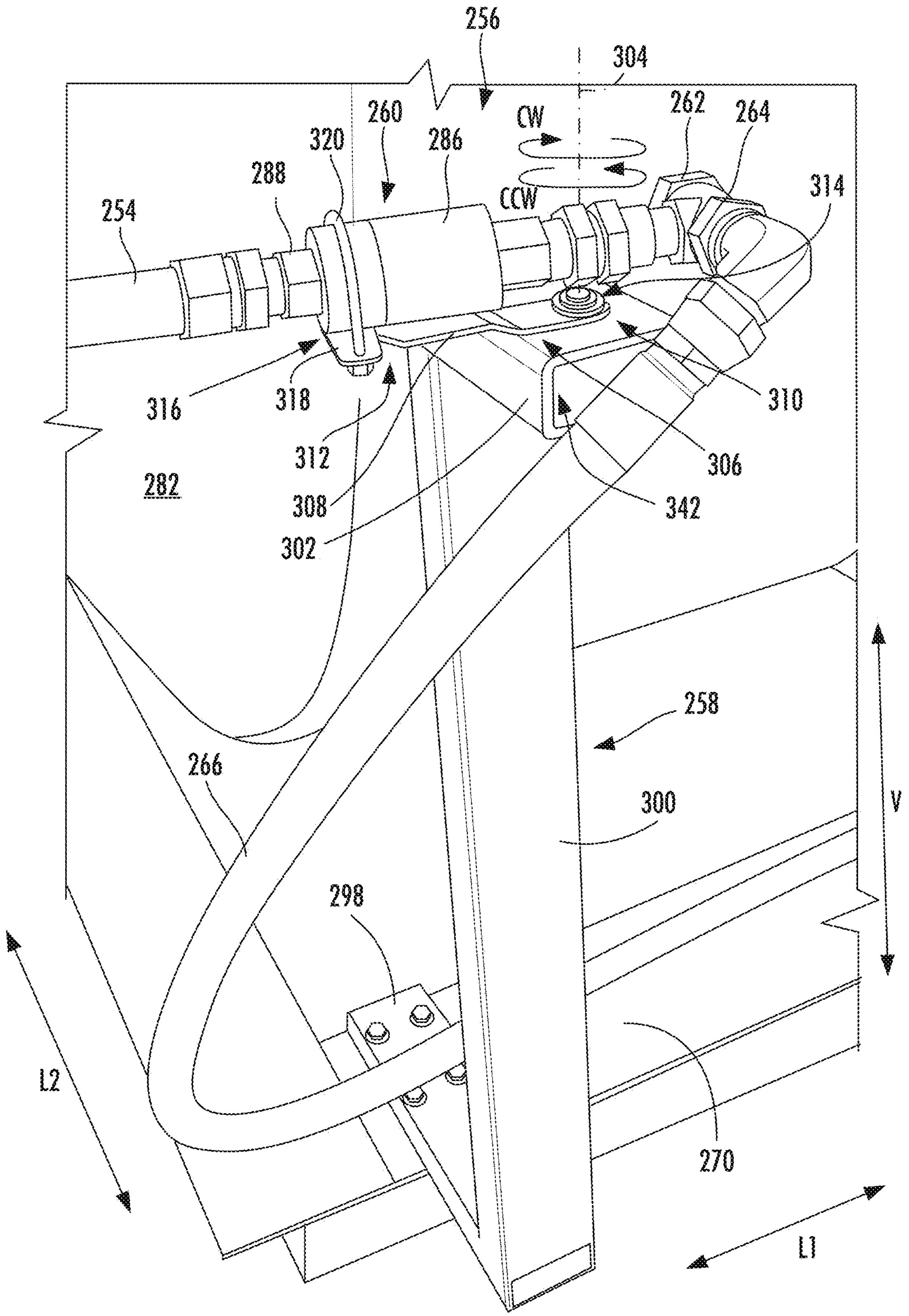
FIG. 8A provides a perspective view of an offboard breakaway assembly in accordance with embodiments of the present disclosure.

With reference now to FIG. 8A, the offboard breakaway assembly 256 will now be described in greater detail. FIG. 8A provides a perspective view of the offboard breakaway assembly 256. For reference, the offboard breakaway assembly 256 defines a longitudinal direction L1, a lateral direction L2, and a vertical direction V, which collectively define an orthogonal direction system.

As noted above, the offboard breakaway assembly 256 includes the breakaway mount 258. For the depicted embodiment of FIG. 8A, the breakaway mount 258 has a Z-shaped cross section (e.g., when viewed along the longitudinal direction L1) and includes multiple members coupled together (via welding, bolted arrangement, etc.) and/or integrally formed with one another so as to form a single monolithic component. Particularly, the breakaway mount 258 includes a base member 298, a vertical member 300 or spine, and a mounting member 302.

The base member 298 extends lengthwise along the lateral direction L2, the vertical member 300 extends lengthwise along the vertical direction V, and the mounting member 302 extends lengthwise along the lateral direction L2. The base member 298 extends from the vertical member 300 in a first direction (e.g., along the lateral direction L2) while the mounting member 302 extends from the vertical member 300 in a second direction (e.g., along the lateral direction L2), with the second direction being an opposite direction of the first direction. The length of the base member 298 can be greater than the length of the mounting member 302, such as in the embodiment of FIG. 8A, or they can be the same length. The base member 298, the vertical member 300, and/or the mounting member 302 can be hollow members. In some embodiments, at least the mounting member 302 is a hollow member.

The base member 298 can include a bottom wall, a top wall, and side walls extending between and connecting the bottom wall and the top wall. The top wall of the base member 298 can define one or more openings. The bottom wall of the base member 298 can define one or more openings aligned with respective openings defined by the top wall. Fasteners (e.g., bolts, screws, etc.) can be received by the openings defined by the top wall as well as by the corresponding openings defined by the bottom wall. In this regard, the base member 298 can be bolted to a structure, such as to a beam of the tank frame 270 upon which the offboard tank 282 is placed or situated. In other embodiments, the base member 298 can be coupled with the structure (such as the tank frame 270) in other suitable manners, such as by welding.

Coupling the base member 298 of the breakaway mount 258 to the tank frame 270 (or other structural element) facilitates or improves the chance that the second half 288 (or breakaway half) of the offboard breakaway coupling 260 will breakaway as intended, e.g., when the vehicle 102 (FIG. 1) is moved away from the offboard breakaway coupling 260 too far a distance or too rapidly, rather than the breakaway mount 258 being the "break away" point. Also, due to the structural integrity of the tank frame 270 and the weight of the offboard tank 282 thereon, such a coupling engagement to the tank frame 270 makes it unlikely that such items will "break away" along with the breakaway mount 258 in the event the breakaway mount 258 does break away. This can provide enhanced safety upon the occurrence of a breakaway event.

With reference still to FIG. 8A, the offboard breakaway coupling 260 is pivotably mounted to the breakaway mount 258 so as to allow the offboard breakaway coupling 260 to swivel or pivot about a pivot axis 304. For instance, the offboard breakaway coupling 260 can swivel or pivot about the pivot axis 304 in a clockwise direction CW or a counterclockwise direction CCW as shown in FIG. 8A. The swivel or pivot ability of the offboard breakaway coupling 260 advantageously accommodates a distance between the vehicle 102 (FIG. 1) and the mount point of the offboard breakaway coupling 260 and also the direction of travel of the vehicle 102. The flexible hose 266 coupled with the offboard breakaway coupling 260 (via the connector 264) can have sufficient slack to allow the offboard breakaway coupling 260 to pivot or rotate to a desired angle or position.

To enable swivel or pivot operation, the offboard breakaway assembly 256 can include a pivot assembly 306 that functions to pivotably couple the offboard breakaway coupling 260 with the breakaway mount 258. The pivot assembly 306 includes a pivot plate 308, a pivot stack 314, and a retention mechanism, such as a ring-anchor assembly 316. Generally, the pivot stack 314 pivotably couples one end of the pivot plate 308 with the breakaway mount 258 and the ring-anchor assembly 316 couples the other end of the pivot plate 308 with the offboard breakaway coupling 260.

Particularly, the pivot plate 308 extends between a first end 310 (e.g., the pivot end) and a second end 312 (e.g., a free end). The first end 310 of the pivot plate 308 is pivotably coupled with the mounting member 302 of the breakaway mount 258, e.g., via the pivot stack 314. The second end 312 of the pivot plate 308 is rigidly coupled with the first half 286 of the offboard breakaway coupling 260, e.g., via the ring-anchor assembly 316 as depicted in FIG. 8A. As shown, the ring-anchor assembly 316 includes an anchor plate 318 and a ring 320. The anchor plate 318 is coupled to the second end 312 of the pivot plate 308 (e.g., via a bolted connection, a welded connection, a combination thereof, or the two plates can be integrally formed with one another to form a single monolithic component). The ring 320, which has a U-Shape in the depicted embodiment of FIG. 8A, is fitted around at least a portion of the first half 286 of the offboard breakaway coupling 260. The ends of the ring 320 extend through respective openings defined by the anchor plate 318. Nuts or other securing mechanisms can secure the respective ends of the ring 320 to the anchor plate 318.

Figure 9:
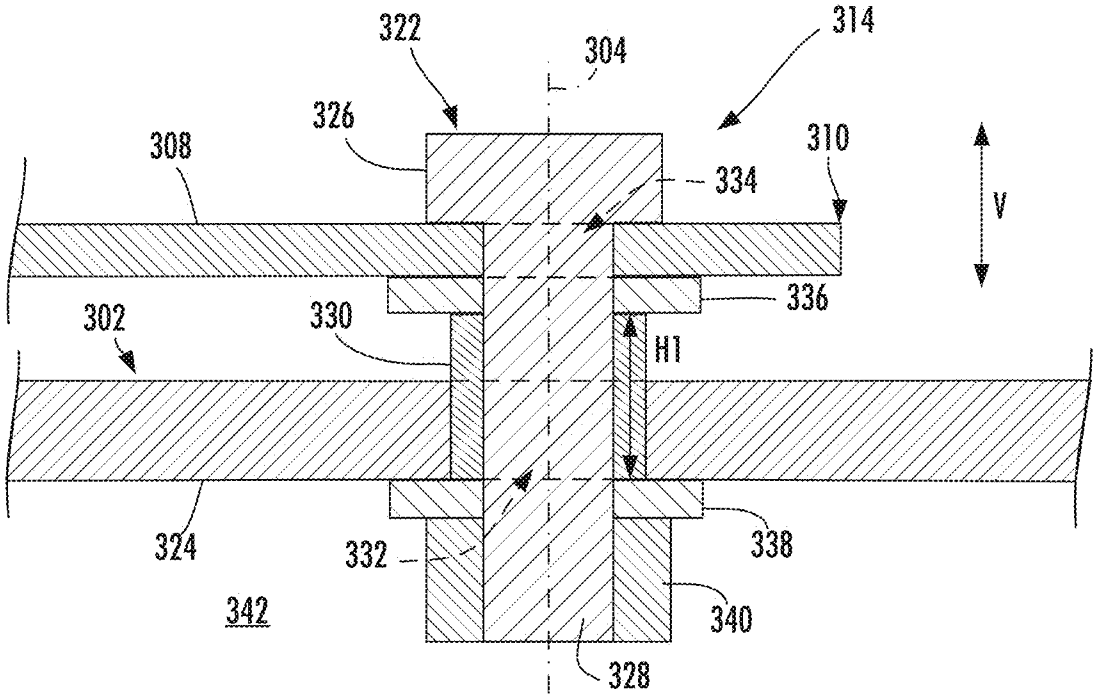
FIG. 9 provides a close-up, cross-sectional view of a pivot stack of the offboard breakaway assembly of FIG. 8A.

FIG. 9 provides a close-up, cross-sectional view of the pivot stack 314. The pivot stack 314 includes a bolt 322 that extends through an opening 332 defined by a top wall 324 of the mounting member 302 and through an opening 334 defined by the pivot plate 308. The openings 332, 334 defined by the top wall 324 and the pivot plate 308 can be concentrically aligned with one another, e.g., as shown in FIG. 9. The bolt 322 is aligned along the pivot axis 304. The bolt 322 has a head 326 and a shank 328 extending from the head 326. The head 326 is positioned vertically above the pivot plate 308 while the shank 328 extends through the opening 332 of the top wall 324 and through the opening 334 of the pivot plate 308. In some embodiments, the head 326 can directly contact the pivot plate 308, e.g., as shown in FIG. 9. In other embodiments, a washer or the like can be positioned between the head 326 and the pivot plate 308.

The pivot stack 314 also includes a spacer 330 wrapped around the shank 328 of the bolt 322. The spacer 330 is configured as a hollow cylinder in the depicted embodiment of FIG. 9. The spacer 330 can be formed of a metallic material, an elastomer material, a composite material, etc. As shown in FIG. 9, the spacer 330 extends through the top wall 324. Accordingly, a diameter of the opening 332 of the top wall 324 is greater than an outside diameter of the spacer 330. Moreover, the spacer 330 is positioned between opposing mechanical stops of the pivot stack 314. For the depicted embodiment of FIG. 9, the opposing mechanical stops include a first washer 336 and a second washer 338. The first and second washers 336, 338 can be fender washers, for example. The first washer 336 is positioned on one side of the spacer 330 (e.g., a top or first side) while the second washer 338 is positioned on the other side of the spacer 330 (e.g., a bottom or second side). Specifically, for the illustrated embodiment of FIG. 9, the first washer 336 is positioned vertically above the top wall 324 and vertically below the pivot plate 308. The second washer 338 is positioned vertically below the top wall 324.

When the pivot stack 314 is assembled, the first and second washers 336, 338 are compressed against opposing sides of the spacer 330, with the first washer 336 being compressed against a first end (e.g., a top end) of the spacer 330 and the second washer 338 being compressed against a second end (e.g., a bottom end) of the spacer 330. The first and second washers 336, 338 are compressed against the spacer 330 by tightening of a nut 340 secured to a distal end of the shank 328. The nut 340 can be threaded onto a threaded portion of the shank 328, for example. When secured to the shank 328, the second washer 338 and the nut 340 can be positioned within a hollow interior 342 defined by the top wall 324, bottom wall, and sidewalls of the mounting member 302 (see also FIG. 8A, which depicts the hollow interior 342 defined by the mounting member 302).

The coupling of the nut 340 onto the shank 328 causes the nut 340 to apply a force (e.g., an upward force) on the second washer 338, which in turn applies a force on the second end of the spacer 330. Moreover, the coupling of the nut 340 onto the shank 328 causes the first washer 336 to apply a force (e.g., a downward force) on the first end of the spacer 330, namely because tightening of the nut 340 draws the head 326 and the pivot plate 308 downward toward the spacer 330.

Figure 10:
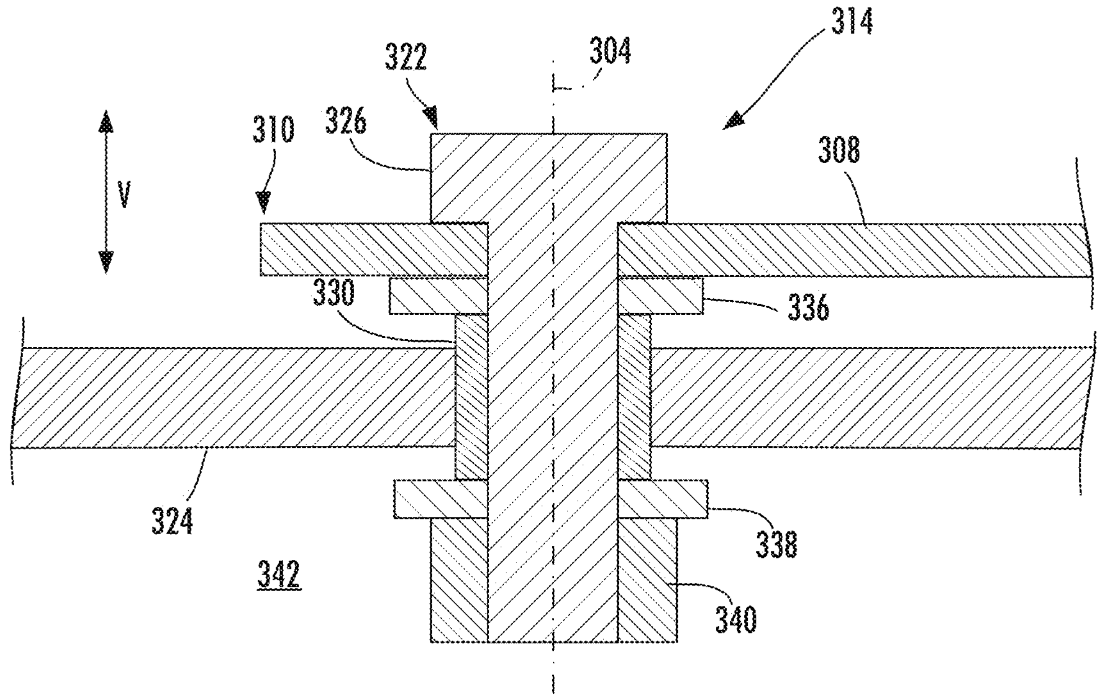
FIG. 10 provides a close-up, cross-sectional view of the pivot stack of FIG. 9 with a pivot plate thereof swiveled to a different position than its position in FIG. 9.

Notably, the spacer 330 maintains a set distance between the head 326 of the bolt 322 and the nut 340. The set distance allows the pivot plate 308 to rotate around the bolt 322 about the pivot axis 304. In this way, the spacer 330 functions as an inner ring of a bearing. The bolt 322 is held in a stationary position during a pivot movement. The spacer 330 has a height H1 that is greater than the vertical thickness of the top wall 324. This allows the spacer 330 to maintain the set distance between the head 326 of the bolt 322 and the nut 340 and allows for the pivot assembly 306 to move vertically relative to the top wall 324. For instance, in FIG. 10, which shows another close-up, cross-sectional view of the pivot stack 314 with the pivot plate 308 rotated one hundred eighty (180°) from its position in FIG. 9, the height H1 of the spacer 330 can allow for the pivot assembly 306, and consequently the offboard breakaway coupling 260 (FIG. 8A) coupled thereto, to move vertically relative to the top wall 324 of the mounting member 302.

In alternative embodiments, the pivot stack 314 can have other suitable configurations. For instance, in some embodiments, the first and second washers 336, 338 can be omitted. In such embodiments, the opposing mechanical stops book-ending the spacer 330 can be the pivot plate 308 and the nut 340.

Figure 8B:
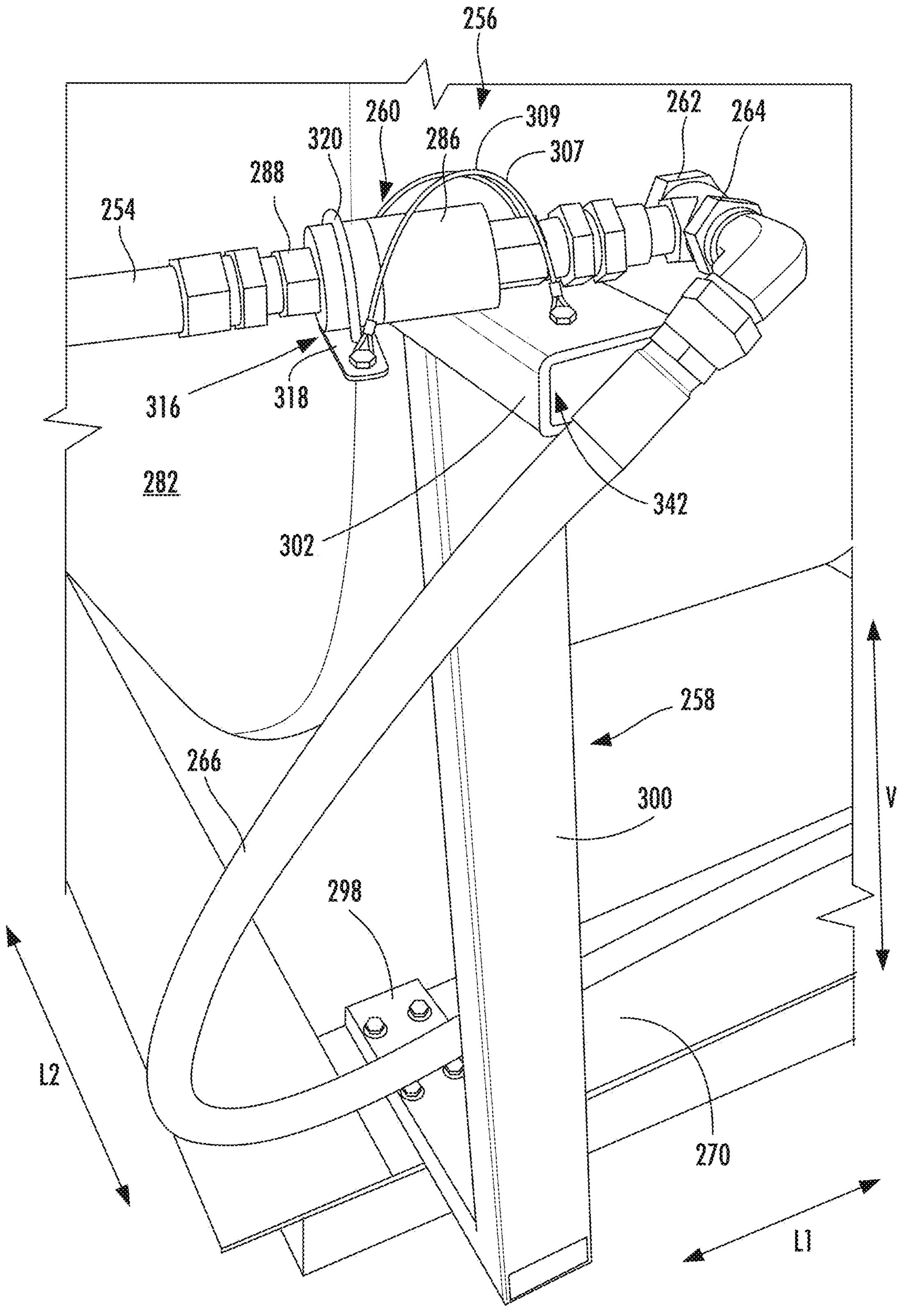
FIG. 8B provides a perspective view of an offboard breakaway assembly in accordance with embodiments of the present disclosure.

FIG. 8B illustrates another embodiment of the breakaway coupling 260 where the pivot plate 308 and pivot stack 314 of the offboard breakaway assembly 256 are replaced by a lanyard style breakaway 307 that permits movement of the breakaway coupling 260 in more than a clockwise direction CW or counterclockwise direction CCW as shown in FIG. 8A. The lanyard style breakaway 307 can include, for example, one or more cables 309 interfaced between the mounting member 302 and the breakaway coupling 260. In an embodiment, the cable(s) 309 can extend around the breakaway coupling 260, or a component associated therewith. In another embodiment, the cable(s) 309 can be interfaced with the breakaway coupling 260, or a component associated therewith, without extending around the breakaway coupling 260. The cable(s) 309 can further be anchored to the mounting member 302 and to the ring-anchor assembly 316. Movement of the breakaway coupling 260 is constrained by the cable(s) 309 while also allowing for breakaway, e.g., when the vehicle 102 (FIG. 1) is moved away from the offboard breakaway coupling 260 too far a distance or too rapidly.

Figure 11:
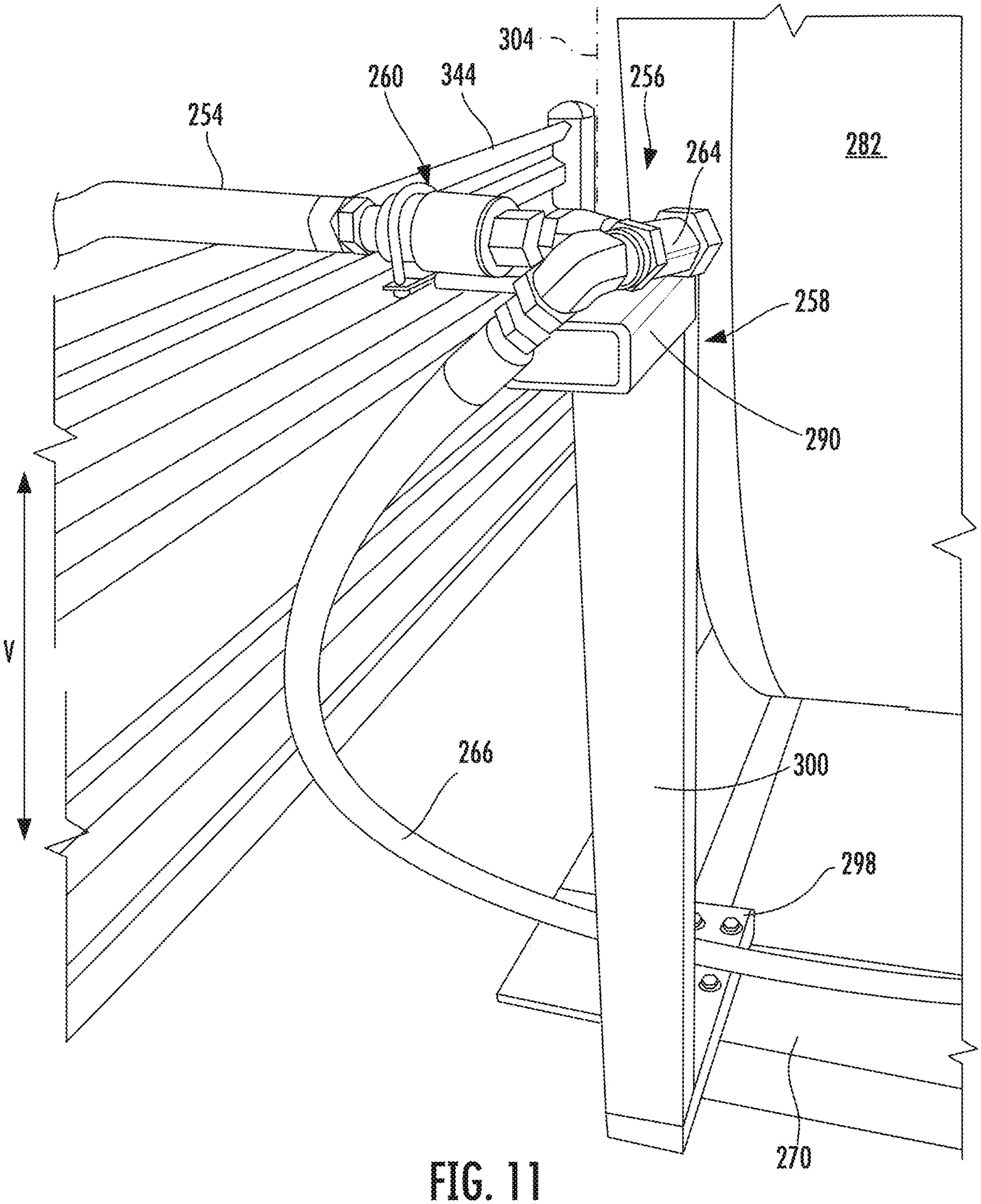
FIG. 11 provides a perspective view of an offboard breakaway assembly having a breakaway mount arranged so as to extend vertically to a predetermined height to provide a mounting platform for an offboard breakaway coupling to clear obstacles in accordance with embodiments of the present disclosure.

With reference now to FIG. 11, the breakaway mount 258 is arranged so as to extend vertically to a predetermined height to provide a mounting platform for the offboard breakaway coupling 260 to clear obstacles, such as a barrier 344 surrounding at least a portion of the offboard tank 282, while swiveling or pivoting about the pivot axis 304. For instance, in some embodiments, the breakaway mount 258 is arranged so that the offboard breakaway coupling 260 is positioned vertically above the barrier 344 that forms at least a portion of a perimeter around the offboard tank 282. Stated another way, the breakaway mount 258 is arranged so that the offboard breakaway coupling 260 is positioned at a height that is greater than a height of the barrier 344 that forms at least a portion of the perimeter around the offboard tank 282. In some embodiments, the breakaway mount 258 is arranged so that the offboard breakaway coupling 260 is positioned at a height greater than or equal to four feet (4 ft. or 1.22 meters).

Figure 12:
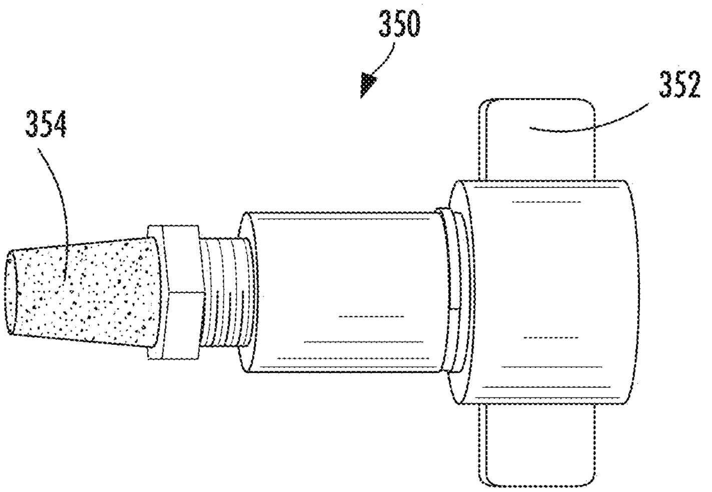
FIG. 12 provides a perspective of an offboard muffler in accordance with embodiments of the present disclosure.

With reference now to FIGS. 1 and 12, in some embodiments, the offload system 200 can include an offload-to-atmosphere muffler, or offload muffler 350, that is removably connectable with the onboard connector 222 of the onboard system 210. When connected with the onboard connector 222, the offload muffler 350 can function to release gas containing the target species to the atmosphere, e.g., for safely emptying the gas containing the target species from the lines of the onboard system 210 and/or from the storage vessels 162A, 162B, 162C. The offload muffler 350 can include an offboard muffler connector 352 and a muffler 354. The offboard muffler connector 352 can be a wingnut coupling, e.g., as shown in FIG. 12. However, other suitable connectors/couplings are possible. The muffler 354 can be formed of a porous metal material that allows gas containing the target species to escape therethrough. The porous metal material can also dampen the sound heard when the off-loaded gas depressurizes.

Figure 13:
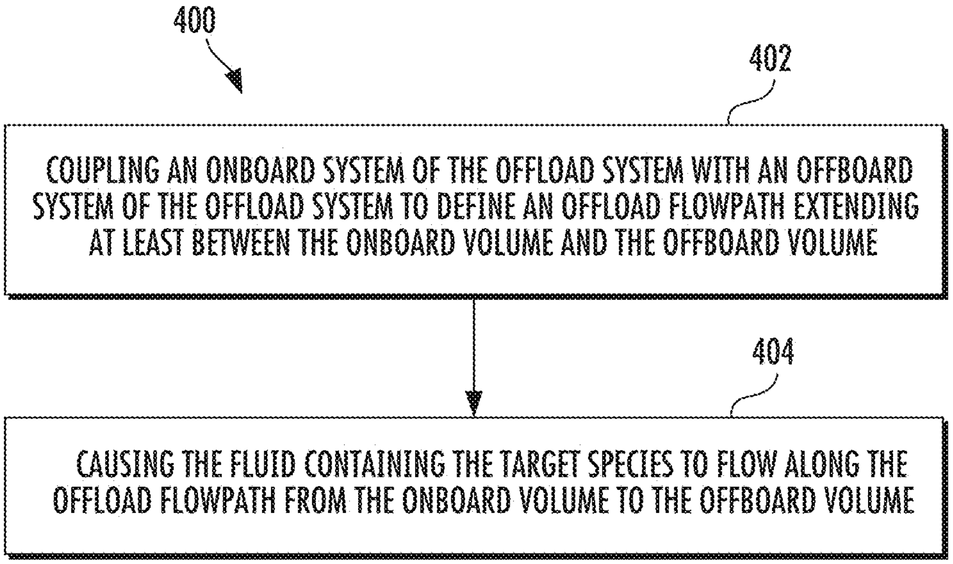
FIG. 13 provides a flow diagram for a method of offloading a target species from an onboard volume positioned onboard a mobile platform to an offboard volume in accordance with embodiments of the present disclosure.

FIG. 13 provides a flow diagram for a method 400 of performing an offload operation, or stated differently, a method of offloading a gas containing a target species stored in an onboard volume positioned onboard a vehicle (e.g., a truck, tractor, or train) to an offboard volume positioned offboard the vehicle. As one example, the method 400 can be implemented by the offload system 200 of FIG. 1 to offload a target species (e.g., carbon dioxide) stored in the storage vessels 162A, 162B, 162C positioned onboard the vehicle 102 to the offboard volume 280.

At 402, the method 400 includes coupling an onboard system of the offload system with an offboard system of the offload system to define an offload flowpath extending at least between the onboard volume and the offboard volume. For instance, after a target species (e.g., carbon dioxide) is captured from an input fluid (e.g., a vehicle exhaust gas) by a capture system of a mobile capture system, a gas containing the target species can be compressed and stored in an onboard volume, such as a storage vessel positioned onboard the vehicle. The vehicle can be positioned relative to the offboard system when it is desired to perform an offload operation. The offboard system is positioned off-board the vehicle. The offboard volume can be defined by an offboard tank of the offboard system.

In some implementations, coupling the onboard system with the offboard system includes coupling an onboard connector with an offboard connector. The offboard connector can be a component of the offboard system while the onboard connector can be component of the onboard system positioned onboard the vehicle. As one example, the onboard connector and the offboard connector can be coupled with one another via a threaded engagement. In other implementations, the onboard connector and the offboard connector can be coupled in other suitable manners.

At 404, the method 400 includes causing the fluid containing the target species to flow along the offload flowpath from the onboard volume to the offboard volume. For instance, once the onboard system is coupled with the offboard system, an offload operation can safely commence. In some implementations, causing the fluid containing the target species to flow along the offload flowpath from the onboard volume to the offboard volume can include opening an offload valve positioned onboard the vehicle and along the offload flowpath. Opening the offload valve can allow the fluid containing the target species, which can be stored at a relatively high pressure in the onboard volume, to flow downstream to the relatively low pressure offboard volume.

In some implementations, the offload valve is opened in response to an operator input. For instance, a touchscreen or display device can prompt a user to confirm that the operator connected the offboard connector with the onboard connector. Upon confirmation, e.g., via an operator input to the touchscreen, a button, an audible response, etc., the offload valve can be opened to commence the offload operation so that fluid containing the target species flows along the offload flowpath from the onboard volume to the offboard volume. In other implementations, the offload valve is opened automatically in response to the coupling of the onboard connector with the offboard connector. For instance, the onboard connector and/or the offboard connector can include a sensor or other means to detect when the onboard connector is connected to the offboard connector. In such implementations, the offload valve is opened automatically when the sensor detects a connection between the onboard and offboard connectors. In this way, the offload valve can be automatically opened (e.g., automatically energized by electric current) to commence the offload operation so that fluid containing the target species flows along the offload flowpath from the onboard volume to the offboard volume.

In some implementations, causing the fluid containing the target species to flow along the offload flowpath from the onboard volume to the offboard volume at 404 can include opening each offload valve of a plurality of offload valves, with each offload valve being associated with an onboard volume. The offload valves can be opened simultaneously, sequentially, or in some other manner.

In some further implementations, at least one breakaway coupling is positioned along the offload flowpath. The breakaway coupling can provide a designated break point in the offload flowpath in the event the vehicle is moved away too far a distance from the offboard system. In some variants, the breakaway coupling is positioned onboard the vehicle and configured as an onboard breakaway coupling. The breakaway coupling positioned onboard the vehicle can be pivotably mounted to the vehicle (e.g., to a main offload line), such as by way of a ball and socket pivot joint, a twisting joint, a revolving joint, rotational joint, sliding joint, etc.

In other variants, the breakaway coupling is positioned offboard the vehicle and configured as an offboard breakaway coupling. The breakaway coupling positioned offboard the vehicle can be pivotably mounted to a breakaway mount. In this way, the breakaway coupling positioned offboard the vehicle can pivot or swivel about a pivot axis. The pivot axis can be aligned with a vertical direction. In other variants, The breakaway coupling positioned offboard the vehicle can be pivotably mounted to a breakaway mount by way of a ball and socket pivot joint, a twisting joint, a revolving joint, rotational joint, sliding joint, etc. In some implementations, the breakaway mount is arranged so that the breakaway coupling positioned offboard the vehicle is positioned vertically above a barrier that forms at least a portion of a perimeter around an offboard tank that defines the offboard volume.

In yet other variants, an onboard breakaway coupling is positioned onboard the vehicle and along the offload flowpath, and an offboard breakaway coupling is positioned offboard the vehicle and along the offload flowpath. This may provide enhanced safety for an offload operation.

In some additional implementations, during offload operation, the offload system can monitor for breakaway events. Indeed, in such implementations, one or more control actions can be taken in response to a determination that a breakaway event has occurred. Accordingly, the method 400 can include determining that a breakaway event has occurred where a first half of a breakaway coupling has broken away from a second half of the breakaway coupling. The determination can be based on one or more sensor signals indicating that the first half of the breakaway coupling has broken away from the second half. In response to determining that the breakaway event has occurred, the method 400 can further include performing a control action.

As one example, performing the control action can include causing one or more offload valves to move to a closed position so as to prevent the target species from flowing downstream along the offload flowpath. As another example, performing the control action can include causing a display, an audio device, or a haptic feedback device, or a combination thereof, to indicate to an operator that the breakaway event has occurred. As yet another example, performing the control action can include causing a driver warning system of the vehicle to automatically apply vehicle brakes, e.g., for safety and so that the vehicle does not "drive away" with a portion of the offload system. As a further example, performing the control action can include causing a warning notification to be presented at a facility at which the offboard volume is located. In other examples, a combination of the foregoing can be performed.

With brief reference to FIGS. 14 and 15, FIG. 14 shows an offload system performing a normal offload operation and FIG. 15 shows the offload system just after a breakaway event has occurred. Numerals used to describe the features of the offload system depicted in FIGS. 14 and 15 will be used for context. As shown in the top plan view of FIG. 14, the vehicle 102, which is a truck for the depicted embodiment, includes the mobile capture system 100 and the onboard system 210. The vehicle 102 has a cab 104 and a fifth wheel 106, and wherein the one or more storage vessels 162A, 162B, 162C of the storage system 160 are mounted to the truck between the cab 104 and the fifth wheel 106. The capture modules of the capture system 120 are likewise mounted to the truck between the cab 104 and the fifth wheel 106. As depicted, the vehicle 102 is parked so that the onboard system 210 can be coupled with the offboard system 250, or rather, such that the offload hose 254 can reach the onboard system 210 so that the offboard connector can be coupled with the onboard connector as shown in FIG. 14. The offboard breakaway coupling 260 can pivot about the pivot axis (extending into and out of the page in FIGS. 14 and 15) to accommodate the position of the vehicle 102 relative to the offboard system 250.

In FIG. 15, the vehicle 102 is moved away from the offboard system 250 with the onboard and offboard connectors still connected. As the vehicle 102 is moved away from the offboard system 250, the offboard breakaway coupling 260 pivots and then the breakaway half of the offboard breakaway coupling 260 ultimately breaks away from its associated base half as shown in FIG. 15. When the breakaway event occurs, one or more control actions can be performed, such as any of the control actions noted herein.

In some further implementations of the method 400, during offload operation, the offload system can monitor for connector decouple events, such as when the onboard connector and offboard connector disconnect or become decoupled from one another. In such implementations, the method 400 can include determining, during an offload operation, that the onboard connector is disconnected from the offboard connector. Such a determination can be made based on one or more signals indicating the onboard connector and the offboard connector have disconnected from one another. For example, a sensor positioned in one or both of the connectors can send such signals. In response to determining that the onboard connector is disconnected from the offboard connector, the method 400 can further include performing a control action, such as causing one more offload valves to move to a closed position so as to prevent the target species from flowing downstream along the offload flowpath.

In yet other implementations, the offload system can monitor and/or determine the total volume of gas containing the target species offloaded from the onboard volume to the offboard volume. Such information can be useful to, among others, the operator and/or entity associated with the operator of the vehicle (e.g., for tracking emissions of the target species and/or receiving credit for reducing greenhouse gas emissions, such as from a governmental entity) and to the manufacturer/designer of the mobile capture system and/or offload system (e.g., for improving future designs, diagnostics, prognostics, health management of the systems, tracking/confirming reduced emissions of the target species, etc.).

Accordingly, in such implementations, the method 400 can include monitoring, during an offload operation, a flow characteristic of the fluid containing the target species flowing along the offload flowpath from the onboard volume to the offboard volume. Example flow characteristics include, without limitation, a mass flow rate, a volumetric flow rate, a pressure, a temperature, a combination of the foregoing, etc. The flow characteristic can be measured at one or more locations along the offload flowpath. The method 400 can further include determining a total volume of the fluid containing the target species offloaded to the offboard volume based at least in part on the flow characteristic. As one example, the total volume of the fluid containing the target species offloaded to the offboard volume can be calculated or predicted directly based on the measured flow characteristic. As another example, the total volume of the fluid containing the target species offloaded to the offboard volume can be calculated or predicted based at least in part on an output of a model, wherein the input to the model is the measured or derived flow characteristic. The model can be a physics-based model, a machine-learned model, etc.

In some further implementations, the method 400 can include crediting/debiting a user account with an exchange medium based at least in part on the total volume of the fluid containing the target species offloaded to the offboard volume. For instance, the user account can be that of the operator and/or an entity associated with the operator. In some implementations, the crediting and/or debiting can be done automatically based at least in part on the total volume of the fluid containing the target species offloaded to the offboard volume. The exchange medium can be any suitable currency, credit, and/or debit, depending on how the emissions, or reduction thereof, is tracked. The credit and/or debits can be, but are not necessarily, in monetary units.

As one example, an entity may hold a certificate issued by a governmental entity that permits the entity to emit a threshold amount of the target species (e.g., carbon dioxide) in a given time period. In such an example, the exchange medium can be in the form of a credit to the entity's account that reduces its predicted and/or calculated emissions of the target species, thus improving the chances the entity will remain under the threshold amount and/or prolong the process of meeting the threshold amount. It will be appreciated that this is just one example and that governmental entities can issue various types of certificates; accordingly, it will be appreciated that the exchange medium can be appropriately selected based on the given certificate or program held by the entity.

In some implementations, the offload system can monitor and/or determine the total volume of fluid containing the target species offloaded from the onboard volume to the offboard volume so that a new storage capacity of the onboard volume or volumes can be predicted. Accordingly, in such implementations, the method 400 can include estimating a new storage capacity of the onboard volume based at least in part on the total volume of the fluid containing the target species offloaded to the offboard volume. The estimate can be in the form of a percentage that denotes the capacity relative to a maximum potential capacity of the onboard volume and/or as a usage time remaining (presented in units of time), for example. In some implementations, the method 400 can include causing the new storage capacity to be presented to an operator, e.g., on a display positioned within a cab of the truck.

In some further implementations, the method 400 can include ceasing the offload operation. For instance, assuming a normal offload operation has occurred (e.g., no breakaway or connector decoupling event has occurred), the one or more processors can cause the one or more offload valves 212A, 212B, 212C to move to their respective closed positions.

As one example, the one or more processors can cause the one or more offload valves 212A, 212B, 212C to move to their respective closed positions based at least in part on a pressure within their associated storage vessels 162A, 162B, 162C falling below a threshold pressure, which can be a pressure that is equal to the pressure of the fluid within the offboard volume. In this regard, the threshold pressure can vary depending on the pressure of the fluid within the offboard volume. As a further example, the one or more processors can cause the one or more offload valves 212A, 212B, 212C to move to their respective closed positions based at least in part on a flow rate of the fluid containing the target species flowing along the offload flowpath. For instance, when the flow rate falls below a threshold flow rate, the offload valves can be moved to a closed position.

As yet another example, the one or more processors can cause the one or more offload valves 212A, 212B, 212C to move to their respective closed positions based at least in part on an offload operation time expiring. For instance, the offload operation time can be set as a time period based at least in part on a current storage capacity of the onboard volume. By way of example, given a storage capacity of ninety-four percent (94%) of a maximum storage capacity, the offload operation time can be set based at least in part on the onboard volume being at a current storage capacity of ninety-four percent (94%). The offload operation time can vary from offload operation to offload operation based on the current storage capacity at the time of offload. In other instances, the offload operation time can be set as a time period determined to be a satisfactory offloading time period for a given onboard volume configuration (e.g., their volumes, number of storage vessels, etc.), based on an operator input (e.g., an operator may have limited time and thus may be unable to offload the entire onboard volume), etc.

In addition to closing the offload valves, the offboard connector can be disconnected from the onboard connector, which effectively decouples the onboard system from the offboard system. The offboard connector and the offload hose can then be placed in a secure location. A cap can then be coupled with the onboard connector.

Figure 16:
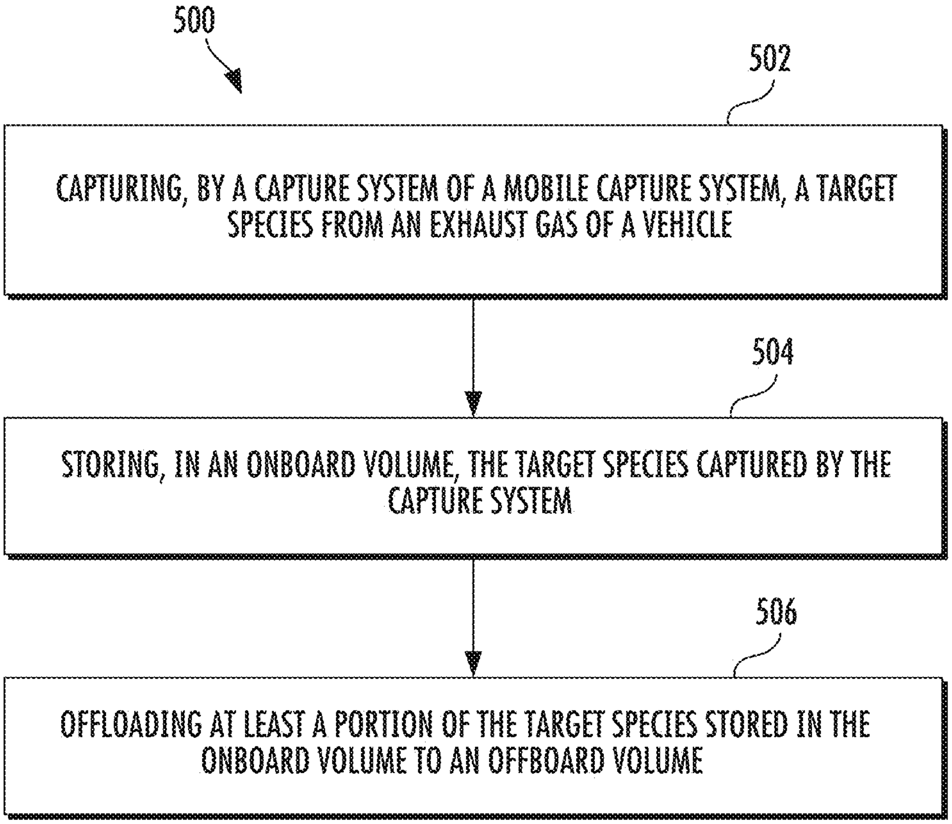
FIG. 16 provides a flow diagram for a method of capturing a target species, storing the target species, and offloading the target species in accordance with embodiments of the present disclosure.

FIG. 16 provides a flow diagram for a method 500. For instance, the method 500 can be implemented by the mobile capture system 100 and the offload system 200 of FIG. 1, for example.

At 502, the method 500 includes capturing, by a capture system of a mobile capture system, a target species from an exhaust gas of a vehicle. For instance, a capture system of a mobile capture system, which can be positioned onboard a vehicle, can have one or more capture modules that function to capture the target species (e.g., carbon dioxide) from an input fluid (e.g., engine exhaust gas). Each capture module can include a capture medium that selectively adsorbs the target species. The captured target species can then be evacuated from the capture modules and sent downstream, e.g., for compression and subsequent storage of the compressed target species.

At 504, the method 500 includes storing, in an onboard volume, the target species captured by the capture system. For instance, after being captured, the target species can be compressed by a compression system and then can be routed downstream to an onboard volume. The onboard volume can be defined by one or a plurality of storage vessels, for example. When the onboard volume is at maximum storage capacity and/or when convenient, the target species stored in the onboard volume can be offloaded.

At 506, the method 500 includes offloading at least a portion of the target species stored in the onboard volume to an offboard volume. For instance, the target species can be offloaded as provided herein, e.g., using the offload system 200 provided in FIG. 1 and described in the accompanying text. Once the target species is offloaded from the onboard volume to the offboard volume, which can be defined by one or more tanks or storage vessels, the onboard volume is primed to receive additional volumes of target species captured by the mobile capture system.

Figure 17:
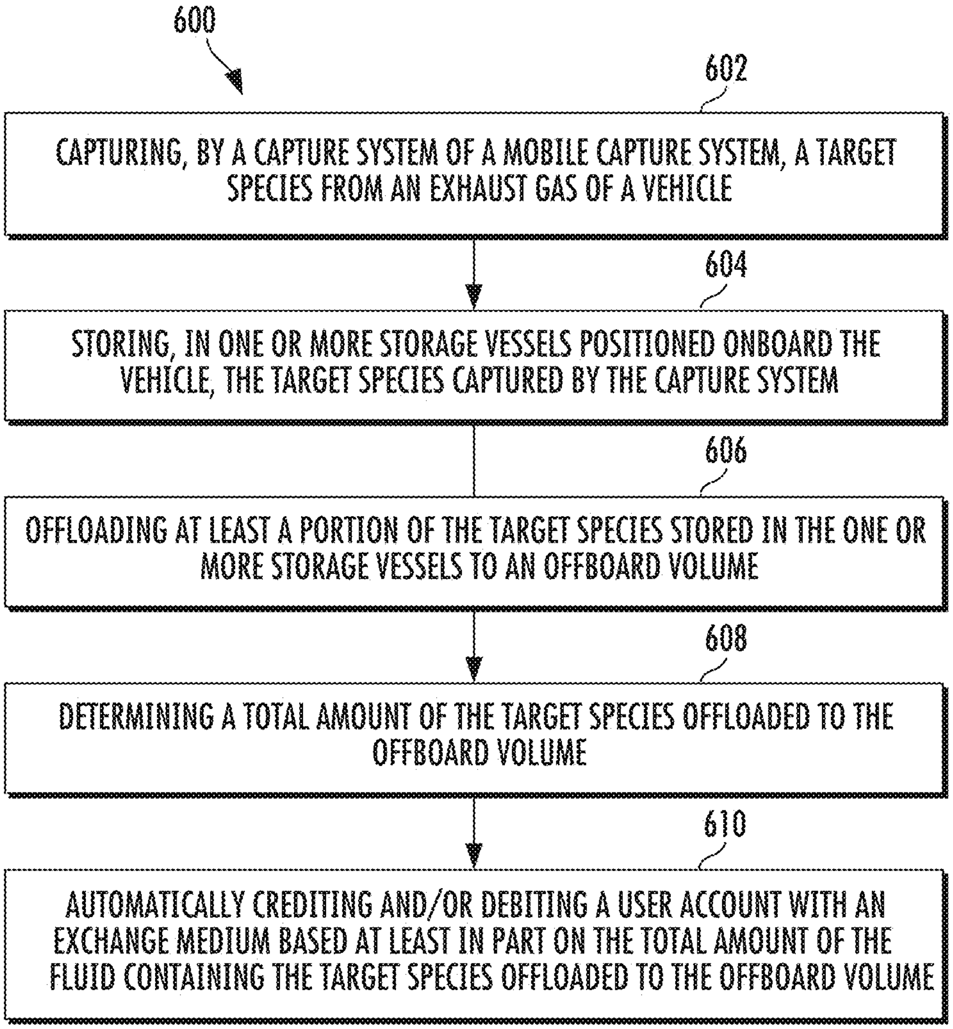
FIG. 17 provides a flow diagram for a method capturing a target species, storing the target species, offloading the target species, determining a total amount of the target species offloaded, and crediting/debiting a user account based on the total amount of target species offloaded in accordance with embodiments of the present disclosure.

FIG. 17 provides a flow diagram for a method 600. For instance, the method 600 can be implemented by the mobile capture system 100 and the offload system 200 of FIG. 1, for example.

At 602, the method 600 includes capturing, by a capture system of a mobile capture system, a target species from an exhaust gas of a vehicle. At 604, the method 600 includes storing, in one or more storage vessels positioned onboard the vehicle, the target species captured by the capture system. At 606, the method 600 includes offloading at least a portion of the target species stored in the one or more storage vessels to an offboard volume. At 608, the method 600 includes determining a total amount of the target species offloaded to the offboard volume.

At 610, the method 600 includes crediting and/or debiting a user account with an exchange medium based at least in part on the total amount of the fluid containing the target species offloaded to the offboard volume. For example, an exchange medium, such as a target species credit, can be generated based at least in part on the total amount of the fluid containing the target species offloaded to the offboard volume. The exchange medium can then be used to credit/debit a user account. For instance, the exchange medium can be sold to a third party.

In some implementations, the crediting and/or debiting at 610 can be performed automatically based at least in part on the total amount of the fluid containing the target species offloaded to the offboard volume. For instance, a lookup table, model, or the like can be used to correlate the total amount of the fluid containing the target species offloaded to the offboard volume with the value, classification, amount, etc. for the exchange medium. The user account can be an account associated with the operator, an entity associated with the vehicle, an entity associated with the mobile capture system, a governmental entity, an entity configured to receive an exchange medium, a combination of the foregoing, etc. In some instances, multiple user accounts can be automatically credited and/or debited with the exchange medium.

Figure 18:
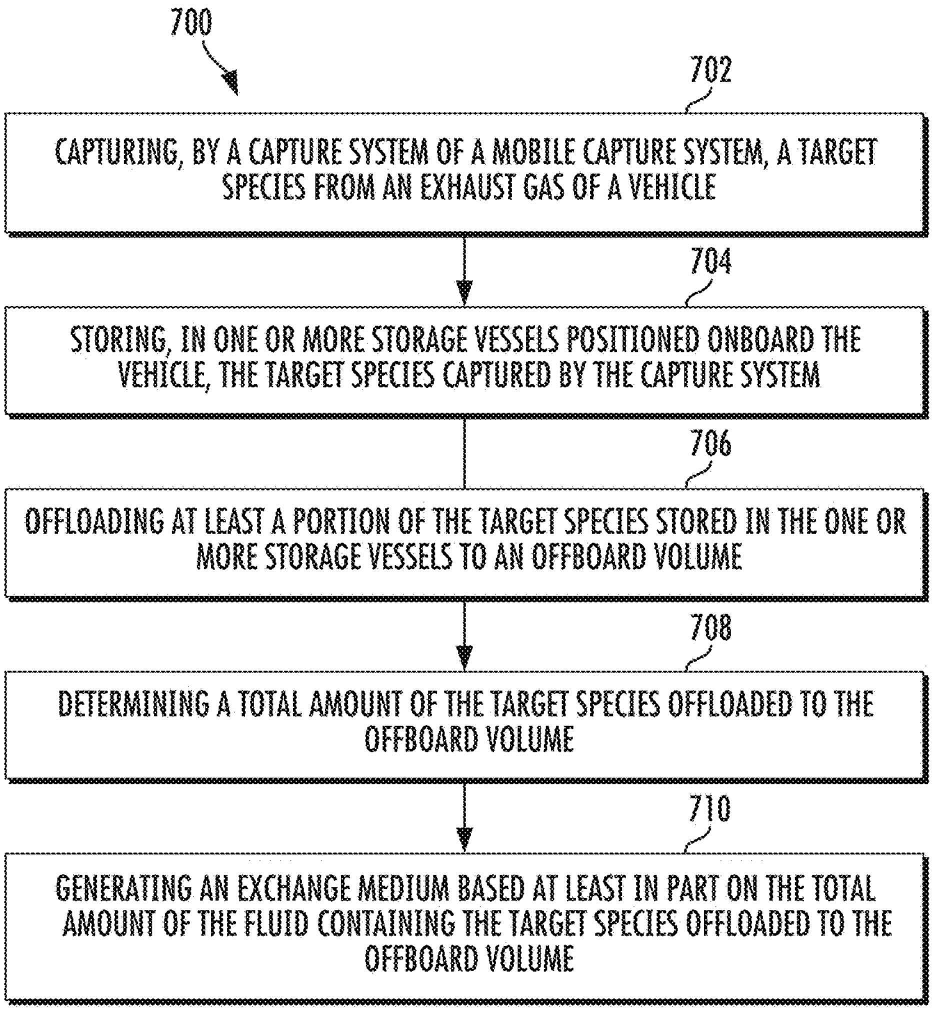
FIG. 18 provides a flow diagram for a method capturing a target species, storing the target species, offloading the target species, determining a total amount of the target species offloaded, and generating an exchange medium based on the total amount of target species offloaded in accordance with embodiments of the present disclosure.

FIG. 18 provides a flow diagram for a method 700. For instance, the method 700 can be implemented by the mobile capture system 100 and the offload system 200 of FIG. 1, for example.

At 702, the method 700 includes capturing, by a capture system of a mobile capture system, a target species from an exhaust gas of a vehicle. At 704, the method 700 includes storing, in one or more storage vessels positioned onboard the vehicle, the target species captured by the capture system. At 706, the method 700 includes offloading at least a portion of the target species stored in the one or more storage vessels to an offboard volume. At 708, the method 700 includes determining a total amount of the target species offloaded to the offboard volume. At 710, the method 700 includes generating an exchange medium based at least in part on the total amount of the fluid (e.g., total volume) containing the target species offloaded to the offboard volume. In some implementations, the exchange medium is a credit associated with reducing and/or capturing carbon dioxide. In other implementations, the method can further include crediting and/or debiting a user account with the exchange medium. In yet other implementations, the method 700 can include selling the exchange medium to a third party.

Computing System

Figure 19:
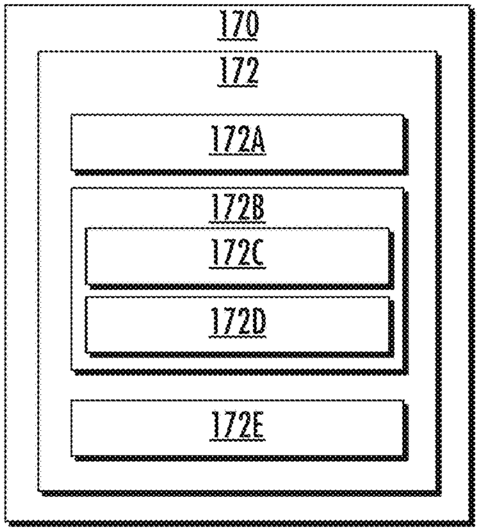
FIG. 19 provides a system diagram of a computing system in accordance with embodiments of the present disclosure.

FIG. 19 provides a system diagram of the computing system 170 of FIG. 1. As shown, the computing system 170 can include one or more computing device(s) 172. The computing device(s) 172 can include one or more processor(s) 172A and one or more memory device(s) 172B. The one or more processor(s) 172A can include any processing device, such as a microprocessor, microcontroller, integrated circuit, logic device, and/or other suitable processing device. The one or more memory device(s) 172B can include one or more computer-readable media, including, but not limited to, a non-transitory computer-readable medium, RAM, ROM, hard drives, flash drives, and/or other memory devices.

The one or more memory device(s) 172B can store information accessible by the one or more processor(s) 172A, including computer-executable or computer-readable instructions 172C that can be executed by the one or more processor(s) 172A. The instructions 172C can be any set of instructions that, when executed by the one or more processor(s) 172A, cause the one or more processor(s) 172A to perform operations, such as any of the operations associated with operation of the mobile capture system 100 (FIG. 1) and/or offload system 200. In some embodiments, the instructions 172C can be executed by the one or more processor(s) 172A to cause the one or more processor(s) 172A to perform operations, such as any of the operations and functions for which the computing system 170 and/or the computing device(s) 172 are configured. The instructions 172C can be software written in any programming language and/or can be implemented in hardware. Additionally, and/or alternatively, the instructions 172C can be executed in logically and/or virtually separate threads on processor(s) 172A. The memory device(s) 172B can further store data 172D that can be accessed by the processor(s) 172A.

The computing device(s) 172 can also include a network interface 172E used to communicate, for example, with the other components of the computing system 170, sensors, controllable devices, etc. (e.g., via a network). The network interface 172E can include components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An offload system for offloading a target species stored in one or more storage vessels of a mobile capture system positioned onboard a vehicle, the offload system comprising:
- an onboard system positioned onboard the vehicle and being configured to selectively allow the target species stored in the one or more storage vessels to flow downstream along an offload flowpath; and
- an offboard system positioned offboard the vehicle and having an offboard tank defining an offboard volume, the offboard system being selectively fluidly coupled with the onboard system so that, when fluidly coupled with one another, the offload flowpath extends at least from the one or more storage vessels to the offboard volume to allow the target species to be offloaded from the one or more storage vessels to the offboard volume, wherein the offboard system includes an offboard breakaway assembly comprising:
  - a breakaway mount;
  - an offboard breakaway coupling; and
  - a pivot assembly pivotably coupling the offboard breakaway coupling with the breakaway mount.

2. The offload system of claim 1, wherein the onboard system includes one or more offload valves each associated with a respective one of the one or more storage vessels, the one or more offload valves being controllable to selectively offload the target species from their respective ones of the one or more storage vessels.

3. The offload system of claim 1, wherein the onboard system includes an onboard breakaway coupling that has a first half and a second half configured to be connected during a normal offload operation but capable of separation under a predetermined tensile force.

4. The offload system of claim 1, wherein
- the pivot assembly is configured to allow the offboard breakaway coupling to pivot about a pivot axis, and wherein the offboard breakaway coupling has a first half and a second half configured to be connected during a normal offload operation but the second half being capable of breaking away from the first half under a predetermined tensile force.

5. The offload system of claim 1, wherein the offboard tank is a stationary tank.

6. The offload system of claim 1, wherein the offboard tank is mounted to a second vehicle.

7. A method of using an offload system to offload a gas containing a target species stored in an onboard volume positioned onboard a vehicle to an offboard volume positioned offboard the vehicle, the method comprising:
- coupling an onboard system of the offload system with an offboard system of the offload system to define an offload flowpath extending at least between the onboard volume and the offboard volume, wherein the offboard system includes an offboard breakaway assembly comprising:
  - a breakaway mount,
  - an offboard breakaway coupling, and
  - a pivot assembly pivotably coupling the offboard breakaway coupling with the breakaway mount; and
- causing the gas containing the target species to flow along the offload flowpath from the onboard volume to the offboard volume.

8. The method of claim 7, wherein coupling the onboard system with the offboard system comprises:
- coupling an onboard connector with an offboard connector.

9. The method of claim 8, wherein causing the gas containing the target species to flow along the offload flowpath from the onboard volume to the offboard volume comprises:
- opening an offload valve positioned onboard the vehicle and along the offload flowpath,
- wherein the offload valve is opened automatically in response to the coupling of the onboard connector with the offboard connector.

10. The method of claim 8, wherein causing the gas containing the target species to flow along the offload flowpath from the onboard volume to the offboard volume comprises:
- opening an offload valve positioned onboard the vehicle and along the offload flowpath,
- wherein the offload valve is opened in response to an operator input.

11. The method of claim 7, wherein an onboard breakaway coupling is positioned onboard the vehicle and along the offload flowpath.

12. The method of claim 7, wherein an onboard breakaway coupling is positioned onboard the vehicle and along the offload flowpath, and the offboard breakaway coupling is positioned offboard the vehicle and along the offload flowpath.

13. The method of claim 7, further comprising:

determining that a breakaway event has occurred where a first half of the offboard breakaway coupling has broken away from a second half of the offboard breakaway coupling; and in response to determining that the breakaway event has occurred, performing a control action.

14. The method of claim 7, further comprising:

determining, during an offload operation, that an onboard connector is disconnected from an offboard connector; and in response to determining that the onboard connector is disconnected from the offboard connector, performing a control action.

15. The method of claim 7, further comprising:

monitoring, during an offload operation, a flow characteristic of the gas containing the target species flowing along the offload flowpath from the onboard volume to the offboard volume; and determining a total volume of the gas containing the target species offloaded to the offboard volume based at least in part on the flow characteristic.

16. The offload system of claim 1, wherein the vehicle comprises a train, and the target species comprises carbon dioxide from a locomotive engine exhaust gas.

17. The offload system of claim 16, wherein the target species comprises carbon dioxide captured from the locomotive engine exhaust gas and from exhaust gas of a fuel-powered generator that provides power to the mobile capture system.

18. The method of claim 7, wherein the vehicle comprises a train, and the target species comprises carbon dioxide from a locomotive engine exhaust gas.

19. The method of claim 18, wherein the target species comprises carbon dioxide captured from the locomotive engine exhaust gas and from exhaust gas of a fuel-powered generator that provides power to the mobile capture system.

20. The method of claim 18, wherein the offboard volume is mounted to a second vehicle.

* * * * *